United States Patent
Gorokhov et al.

(10) Patent No.: US 8,738,056 B2
(45) Date of Patent: May 27, 2014

(54) SIGNAL ACQUISITION IN A WIRELESS COMMUNICATION SYSTEM

(75) Inventors: Alexei Gorokhov, San Diego, CA (US); Aamod Khandekar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1459 days.

(21) Appl. No.: 11/751,467

(22) Filed: May 21, 2007

(65) Prior Publication Data

US 2008/0285526 A1   Nov. 20, 2008

Related U.S. Application Data

(60) Provisional application No. 60/802,628, filed on May 22, 2006.

(51) Int. Cl.
   *H04B 15/00* (2006.01)
   *H04W 4/00* (2009.01)
   *H04B 7/00* (2006.01)

(52) U.S. Cl.
   USPC ........ 455/515; 455/434; 455/422.1; 370/310; 370/328; 370/338

(58) Field of Classification Search
   USPC ............. 455/403, 435.2, 428, 436–453, 515, 455/434, 522
   See application file for complete search history.

(56) References Cited

U.S. PATENT DOCUMENTS

| | | | |
|---|---|---|---|
| 5,781,543 A | 7/1998 | Ault et al. | |
| 6,097,714 A | 8/2000 | Nagatani et al. | |
| 6,137,847 A | 10/2000 | Stott et al. | |
| 6,289,007 B1 | 9/2001 | Kim et al. | |
| 6,370,134 B1 | 4/2002 | Aramaki | |
| 6,414,986 B1 | 7/2002 | Usui | |
| 6,430,200 B1 * | 8/2002 | Han et al. | 370/500 |
| 6,449,481 B1 | 9/2002 | Kwon et al. | |

(Continued)

FOREIGN PATENT DOCUMENTS

| | | |
|---|---|---|
| CL | 22312004 | 6/2005 |
| CL | 14732005 | 1/2006 |

(Continued)

OTHER PUBLICATIONS

International Search Report—PCT/US07/069494, International Search Authority, European Patent Office—Dec. 11, 2007.

(Continued)

*Primary Examiner* — Nathan Mitchell
(74) *Attorney, Agent, or Firm* — Peng Zhu

(57) ABSTRACT

Systems and methodologies are described that generate pilots for signal acquisition in a wireless communication system based on time domain sequences. The pilots may be generated by a base station and transmitted in a pilot field to one or more access terminals to aid in signal acquisition at each of the access terminals. One of the pilots may be common to all access points in the wireless communication system, thereby allowing an access terminal to obtain a timing estimate for the system while minimizing the effects of interference variations between base stations. Further, one or more generated pilots may be unique to each access point in order to allow each respective access point to be identified by its generated pilots.

25 Claims, 16 Drawing Sheets

(56) References Cited

U.S. PATENT DOCUMENTS

| | | | |
|---|---|---|---|
| 6,483,829 B1* | 11/2002 | Yamamoto | 370/342 |
| 6,556,551 B1* | 4/2003 | Schwartz | 370/331 |
| 6,574,205 B1 | 6/2003 | Sato | |
| 6,795,489 B2 | 9/2004 | Joshi et al. | |
| 6,888,805 B2 | 5/2005 | Bender et al. | |
| 6,929,539 B2 | 8/2005 | Schutz et al. | |
| 6,940,827 B2 | 9/2005 | Li et al. | |
| 7,051,725 B2 | 5/2006 | Ikemoto et al. | |
| 7,120,133 B1 | 10/2006 | Joo et al. | |
| 7,197,692 B2 | 3/2007 | Sutivong et al. | |
| 7,280,467 B2 | 10/2007 | Smee et al. | |
| 7,583,584 B2 | 9/2009 | Wang et al. | |
| 7,751,374 B2* | 7/2010 | Donovan | 370/336 |
| 7,756,211 B2* | 7/2010 | Kim et al. | 375/267 |
| 2002/0110138 A1 | 8/2002 | Schramm | |
| 2002/0154610 A1 | 10/2002 | Tiedemann, Jr. et al. | |
| 2002/0193104 A1 | 12/2002 | Scherzer et al. | |
| 2002/0196752 A1 | 12/2002 | Attar et al. | |
| 2003/0035405 A1 | 2/2003 | Nagatani et al. | |
| 2004/0058081 A1 | 3/2004 | Potyrailo et al. | |
| 2004/0233870 A1 | 11/2004 | Willenegger et al. | |
| 2005/0018631 A1 | 1/2005 | Sivakumar et al. | |
| 2005/0063298 A1 | 3/2005 | Ling et al. | |
| 2005/0147025 A1* | 7/2005 | Auer | 370/203 |
| 2005/0163262 A1 | 7/2005 | Gupta | |
| 2005/0201368 A1* | 9/2005 | Periyalwar et al. | 370/356 |
| 2005/0281242 A1 | 12/2005 | Sutivong et al. | |
| 2005/0281290 A1 | 12/2005 | Khandekar et al. | |
| 2006/0019694 A1 | 1/2006 | Sutivong et al. | |
| 2006/0028976 A1 | 2/2006 | Park et al. | |
| 2006/0135162 A1 | 6/2006 | Julian et al. | |
| 2006/0140313 A1 | 6/2006 | Futami et al. | |
| 2006/0183481 A1* | 8/2006 | Furukawa et al. | 455/436 |
| 2006/0209752 A1* | 9/2006 | Wijngaarden et al. | 370/328 |
| 2006/0209927 A1 | 9/2006 | Khandekar et al. | |
| 2007/0173276 A1 | 7/2007 | Love et al. | |
| 2007/0207812 A1 | 9/2007 | Borran et al. | |
| 2007/0287462 A1 | 12/2007 | Gorokhov et al. | |
| 2008/0123616 A1* | 5/2008 | Lee | 370/344 |
| 2008/0279220 A1 | 11/2008 | Wang | |

FOREIGN PATENT DOCUMENTS

| | | |
|---|---|---|
| CL | 14742005 | 1/2006 |
| CL | 14762005 | 1/2006 |
| CN | 1348636 A | 5/2002 |
| JP | 10190625 | 7/1998 |
| JP | H10509287 A | 9/1998 |
| JP | 11088295 A | 3/1999 |
| KR | 1020000067168 | 11/2000 |
| RU | 2145152 C1 | 1/2000 |
| RU | 2149509 | 5/2000 |
| RU | 2157592 | 10/2000 |
| RU | 2178239 C2 | 1/2002 |
| RU | 2395170 | 7/2010 |
| TW | 200610292 | 3/2006 |
| WO | WO9608908 A2 | 3/1996 |
| WO | WO9925080 | 5/1999 |
| WO | 0065736 | 11/2000 |
| WO | 2004064295 A2 | 7/2004 |
| WO | WO2005022797 | 3/2005 |
| WO | WO2005074222 | 8/2005 |
| WO | WO2005107121 A1 | 11/2005 |
| WO | 2006000091 | 1/2006 |
| WO | WO2006009711 | 1/2006 |
| WO | 2006134829 A1 | 12/2006 |
| WO | WO2008042889 | 4/2008 |

OTHER PUBLICATIONS

Kwang Soon Kim et al.: "A Preamble-Based Cell Searching Technique for OFDM Cellular Systems" Vehicular Technology Conference, 2003. VTC 2003-Fall. 2003 IEEE 58th Orlando, FL. USA Oct. 6-9, 2003, Piscataway, NJ, USA, IEEE, US, Oct. 6, 2003, pp. 24712475, XP010702613 ISBN:0-7803-7954-3.

Higuchi K., et al., "Fast Cell Search Algorithm using Long Code Masking in DS-CDMA Asynchronous Cellular System," Technical Report of the Institute of Electronics, Information and Communication Engineers, Jan. 23, 1997, vol. 96, No. 477, pp. 57-63, RCS 96-122.

ETSI ETS 300 744; "Digital Video Broadcasting (DVB); Framing structure, channel coding and modulation for digital Terrestrial television (DVB-T)" Mar. 1997, pp. 25-34.

Pace, et al., "System Level Performance Evaluation of UTRA-FDD (UMTS Terrestrial Radio Access-Frequency Division Duplex)," 11th IEEE International Symposium on Personal, Indoor and Mobile Radio Communications, PIMRC 2000, Sep. 18-21 2000, pp. 343-347, vol. 1.

Taiwanese Search report—096118267—TIPO—Sep. 24, 2010.

UMTS Terrestrial Radio Access Concept Evaluation ETSI Technical Report, Dec. 1997 (1997-12), pp. 47-48, XP002109765.

Written Opinion—PCT/US2007/069494, International Search Authority, European Patent Office, Nov. 12, 2007.

Yeh, et al.; "OFDM System Channel Estimation Using Time-Domain Training Sequence for Mobile Reception of Digital Terrestrial Broadcasting," IEEE Transactions on Broadcasting, vol. 46, Issue 3, Sep. 2000 pp. 215-220.

Bhushan N., "QUALCOMM Proposal for 3GPP2 Air Interface Evolution Phase 2, Rev.2", 3GPP2 Contribution, Mar. 27, 2006, C30-20060327-023R2.

Tomcik J., "MBFDD and MBTDD Wideband Mode: Technology Overview", IEEE 802.20 Working Group on Mobile Broadband Wireless Access, pp. 1-109, Jan. 6, 2006, IEEE C802.20-05/68r1.

Huawei et al., "CoMP clarification of definitions and TP", R1-083906, 3rd Generation Partnership Project (3GPP), Mobile Competence Centre; 650, Route Des Lucioles; F-06921 Sophia-Antipolis Cedex; France, no. Prague, Czech Republic, Oct. 6, 2008, XP050317217, [retrieved on Oct. 6, 2008].

Taiwan Search Report—TW096125068—TIPO—Jun. 23, 2011.

European Search Report—EP11186394—Search Authority—Munich—Apr. 11, 2013.

Tomcik, J., "QFDD and QTDD: Technology Overview", IEEE 802. 20 Working Group on Mobile Broadband Wireless Access, October 28, 2005, pp. 48-50, URL: http://www.IEEE802.Org/20/Contribs/C802.20-05-68.Zip.

Tomcik, J.: "QFDD Technology Overview Presentation," IEEE C802.20-05-59r1, pp. 1-74, Internet Citation, [Online] Nov. 15, 2005,XP002422346, Retrieved from the Internet: URL:http://ieee802.org/20/Contribs/C802.20-05-59r1.pdf> [retrieved on Feb. 27, 2007].

* cited by examiner

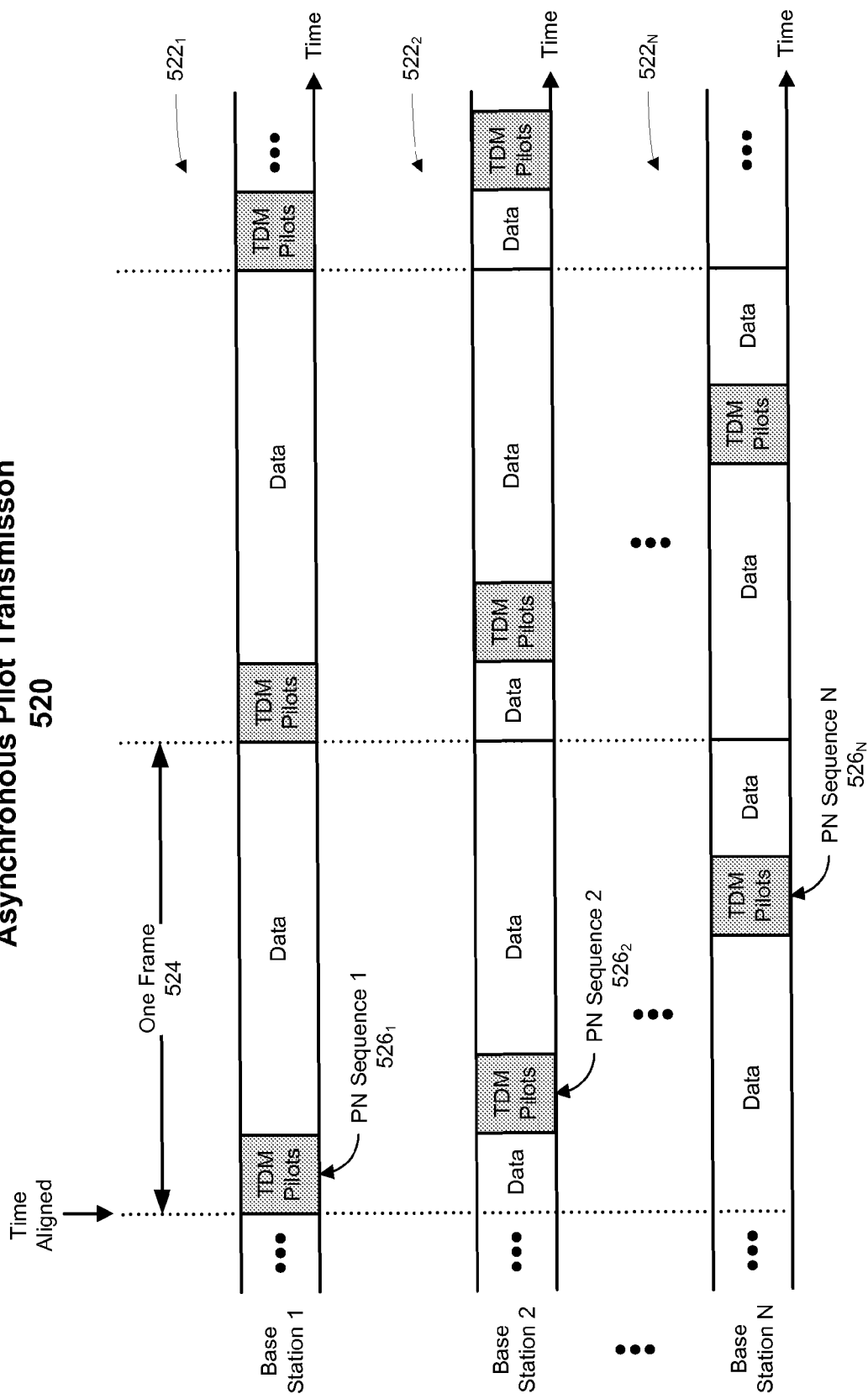

SIGNAL ACQUISITION IN A WIRELESS COMMUNICATION SYSTEM

CROSS-REFERENCE

This application claims the benefit of U.S. Provisional Application Ser. No. 60/802,628, filed May 22, 2006, entitled "SIGNAL ACQUISITION IN A WIRELESS COMMUNICATION SYSTEM," the entirety of which is incorporated herein by reference.

BACKGROUND

I. Field

The present disclosure relates generally to wireless communications, and more specifically to techniques for signal acquisition in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

In a wireless communication system, a base station typically processes (e.g., encodes and symbol maps) data to obtain modulation symbols and then further processes the modulation symbols to generate a modulated signal. A base station then typically transmits the modulated signal via a communication channel. Further, such a system often uses a transmission scheme whereby data is transmitted in frames, with each frame having a particular duration in time.

A wireless terminal in the system may not know which base stations, if any, near its vicinity are transmitting. Furthermore, the terminal may not know the start of each frame for a given base station, the time at which each frame is transmitted by the base station, or the propagation delay introduced by the communication channel. Thus, a terminal can perform signal acquisition to detect for transmissions from base stations in the system and to synchronize to the timing and frequency of each detected base stations of interest. By using the signal acquisition process, a terminal can ascertain the timing of a detected base station and properly perform complementary demodulation for the base station.

Typically, both a base station and a terminal expend system resources to support signal acquisition. Since signal acquisition overhead is necessary for data transmission, it is desirable to minimize the amount of resources used by both base stations and terminals for acquisition. Thus, there is a need in the art for techniques to efficiently perform signal acquisition in a wireless communication system.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by generating acquisition pilots for the signal acquisition process based on time domain pilot sequences. The acquisition pilots may be generated by a base station and transmitted in a pilot field to one or more access terminals to aid in signal acquisition. The generated pilots may be based on one or more pilot sequences that are common to all base stations in a wireless communication system, thereby allowing a terminal in the system to obtain a timing estimate for the system while minimizing the effects of interference variations between base stations. Further, one or more generated pilots may be unique to each base station, thereby allowing the terminal to identify a particular base station for communication.

According to an aspect, a method for generating and transmitting acquisition pilots in a wireless communication system is described herein. The method may comprise generating a first acquisition pilot based at least in part on a first time domain pilot sequence, the first time domain pilot sequence is common to the wireless communication system. Further, the method may include generating a second acquisition pilot based at least in part on a second time domain pilot sequence, the second time domain pilot sequence is common to a subset of the wireless communication system that includes less than all of the wireless communication system. The method may also include generating a third acquisition pilot based at least in part on a third time domain pilot sequence, the third time domain pilot sequence is common to a subset of the wireless communication system that includes less than all of the wireless communication system. Further, the method may include transmitting the first, second, and third time domain pilot sequences to one or more access terminals in a pilot field.

Another aspect relates to a wireless communications apparatus that may include a memory that stores data relating to a first time domain pilot sequence, a second time domain pilot sequence, and a third time domain pilot sequence, wherein the first time domain pilot sequence is common to a system in which the wireless communications apparatus operates and the second time domain pilot sequence and the third time domain pilot sequence are common to a subset of the system that includes less than all of the system. The wireless communications apparatus may further include a processor configured to generate a first acquisition pilot from the first time domain pilot sequence, to generate a second acquisition pilot from the second time domain pilot sequence, to generate a third acquisition pilot from the third time domain pilot sequence, and to transmit the three generated acquisition pilots to a terminal.

Yet another aspect relates to an apparatus that facilitates the generation and transmission of pilot sequences in a wireless communication network. The apparatus may comprise means for generating a first time domain pilot sequence that is common to the wireless communication network. The apparatus may also include means for generating a second time domain pilot sequence that is common to less than all of the wireless communication network. Further, the apparatus may include means for generating a third domain pilot sequence that is common to less than all of the wireless communication network. Additionally, the apparatus may include means for transmitting the generated time domain pilot sequences to one or more users.

Still another aspect relates to a computer-readable medium having stored thereon computer-executable instructions for generating and transmitting information for signal acquisition in a wireless communication environment. The instructions may include generating a first acquisition pilot, a second acquisition pilot, and a third acquisition pilot based on one or more sequences in the time domain, wherein at least one sequence on which the first acquisition pilot is based is common to the wireless communication environment. Further, the instructions may comprise transmitting the generated acquisition pilots to a terminal.

According to another aspect, a processor is described herein that may execute computer-executable instructions for providing acquisition information in a wireless communication network. The instructions may include generating a first acquisition pilot based at least in part on a first time domain sequence. Further, the instructions may comprise generating a second acquisition pilot based at least in part on a second time domain sequence and an identifier for an entity generating the acquisition pilots. In addition, the instructions may include generating a third acquisition pilot based at least in part on a third time domain sequence and the identifier for the entity generating the acquisition pilots.

According to yet another aspect, a method is described herein for signal acquisition in a wireless communication system. The method may comprise detecting a first time domain acquisition pilot, a second time domain acquisition pilot, and a third time domain acquisition pilot. In addition, the method may include identifying an access point for communication based at least in part on the detected time domain acquisition pilots. Further, the method may include synchronizing with the identified access point for communication based at least in part on the detected time domain acquisition pilots.

Another aspect relates to a wireless communications apparatus, which may include a memory and may also include a processor coupled to the memory configured to detect a pilot field comprising three time domain acquisition pilots and to identify and synchronize with a base station for communication based at least in part on the pilot field.

Yet another aspect relates to an apparatus that facilitates signal acquisition in a wireless communication network. The apparatus may comprise means for detecting a first acquisition pilot based at least in part on a first time domain pilot sequence. In addition, the apparatus may include means for detecting a second acquisition pilot based at least in part on a second time domain pilot sequence. The apparatus may also include means for detecting a third acquisition pilot based at least in part on a third time domain pilot sequence. Further, the apparatus may include means for identifying an entity corresponding to the detected acquisition pilots. The apparatus may additionally include means for synchronizing with the entity corresponding to the detected acquisition pilots.

Still another aspect relates to a computer-readable medium having stored thereon computer-executable instructions for acquiring information for communication in a wireless communication environment. The instructions may include detecting a first acquisition pilot, a second acquisition pilot, and a third acquisition pilot, each acquisition pilot based on one or more sequences in the time domain. The instructions may also include identifying an access point for communication based on the detected acquisition pilots. Further, the instructions may include acquiring timing information corresponding to the identified access point based on the detected acquisition pilots.

According to another aspect, a processor is described herein that may execute computer-executable instructions for acquiring a signal for communication in a wireless communication system. The instructions may comprise detecting a pilot field comprising a first time domain pilot sequence, a second time domain pilot sequence, and a third time domain pilot sequence, wherein the first time domain pilot sequence is common to the wireless communication system. Further, the instructions may include establishing a connection for communication with a base station based at least in part on the detected pilot field.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

BRIEF DESCRIPTION OF THE DRAWINGS

FIG. 5B illustrates an example staggered forward link pilot transmission scheme in accordance with various aspects.

DETAILED DESCRIPTION

Figure 1:
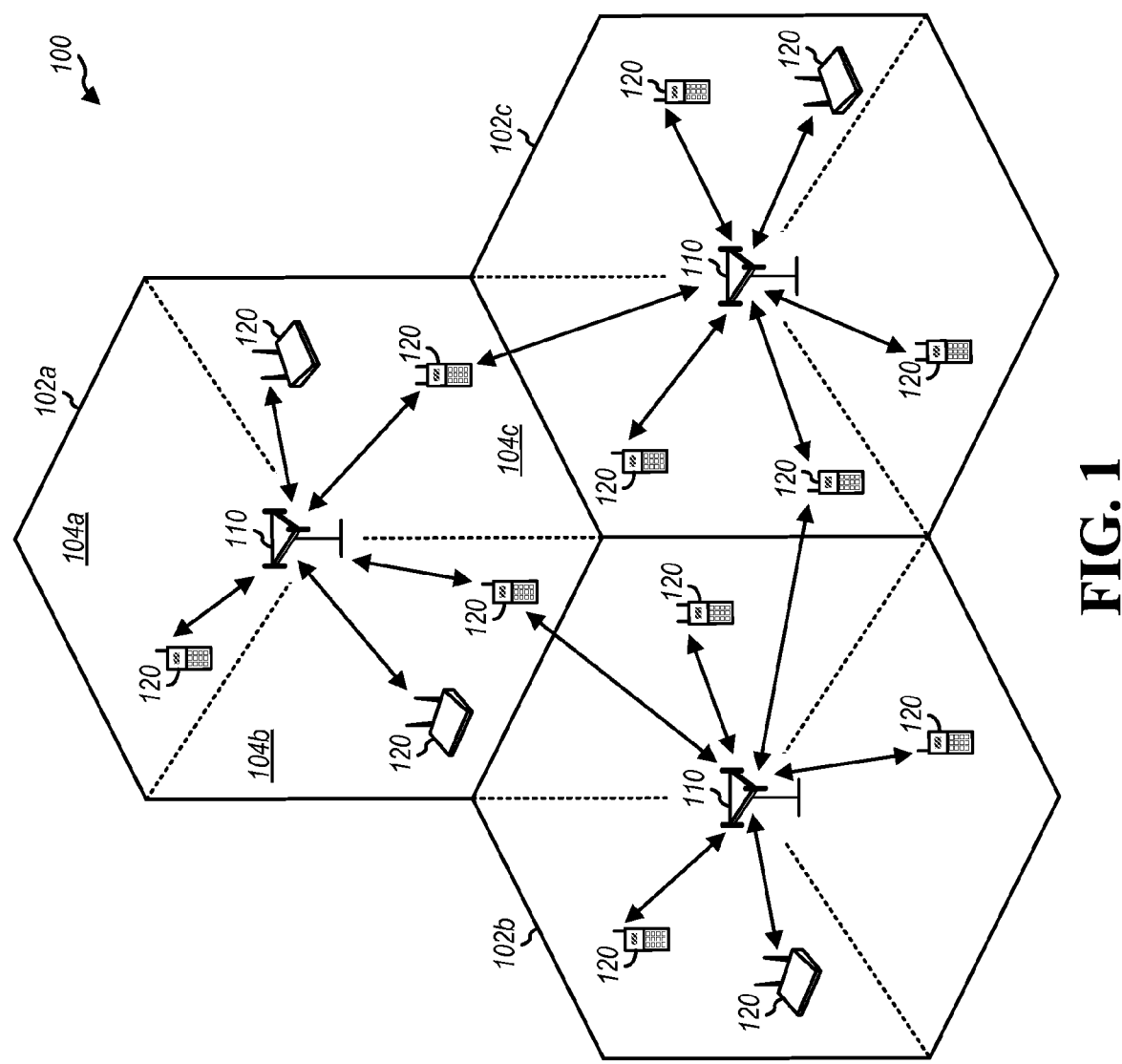
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used. To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In a cell 102 having multiple sectors 104, the BTSs for all sectors 104 of the cell 102 can be co-located within the base station 110 for the cell 102.

In another example, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal may be a wireless device, a cellular phone, a personal digital assistant (PDA), a wireless modem, a handheld device, or another suitable device.

In accordance with one aspect, a new connection for communication can be established between a base station 110 and a terminal 120 when, for example, a terminal 120 is powered on or moves to a new cell 102 or sector 104 in system 100. Before a terminal 120 can communicate with a base station 110 using this connection, the terminal 120 generally must determine timing and identification information for the base station 110 through a process known as acquisition. In order to aid in acquisition, a base station 110 may transmit one or more acquisition pilots. Traditionally, a base station 110 can transmit acquisition pilots in the form of beacons, frequency domain pseudo-noise (PN) sequences, or generalized chirplike (GCL) sequences. However, while each of these traditional pilot formats offers different advantages in some scenarios, they all have significant drawbacks. For example, beacons may perform very poorly in a system with large interference variations, frequency-domain PN sequences may have poor peak-to-average (PAR) properties, and GCL sequences are limited in number and hence need network planning. Accordingly, to overcome the deficiencies associated with traditional pilot formats, a base station 110 may utilize one or more time domain pilots (e.g., time division multiplexed (TDM) pilots) to facilitate signal acquisition in accordance with various aspects described herein.

In one example, system 100 may utilize one or more multiple-access schemes, such as CDMA, TDMA, FDMA, OFDMA, Single-Carrier FDMA (SC-FDMA), and/or other suitable multiple-access schemes. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally and/or alternatively, the system bandwidth can be divided into one or more frequency carriers, each of which may contain one or more subcarriers. System 100 may also utilize a combination of multiple-access schemes, such as OFDMA and CDMA. Additionally, system 100 may utilize various framing structures to indicate the manner in which data and signaling are sent on the forward and reverse links. For clarity, non-limiting examples of framing structures that system 100 may utilize are described in more detail herein.

Figure 2:
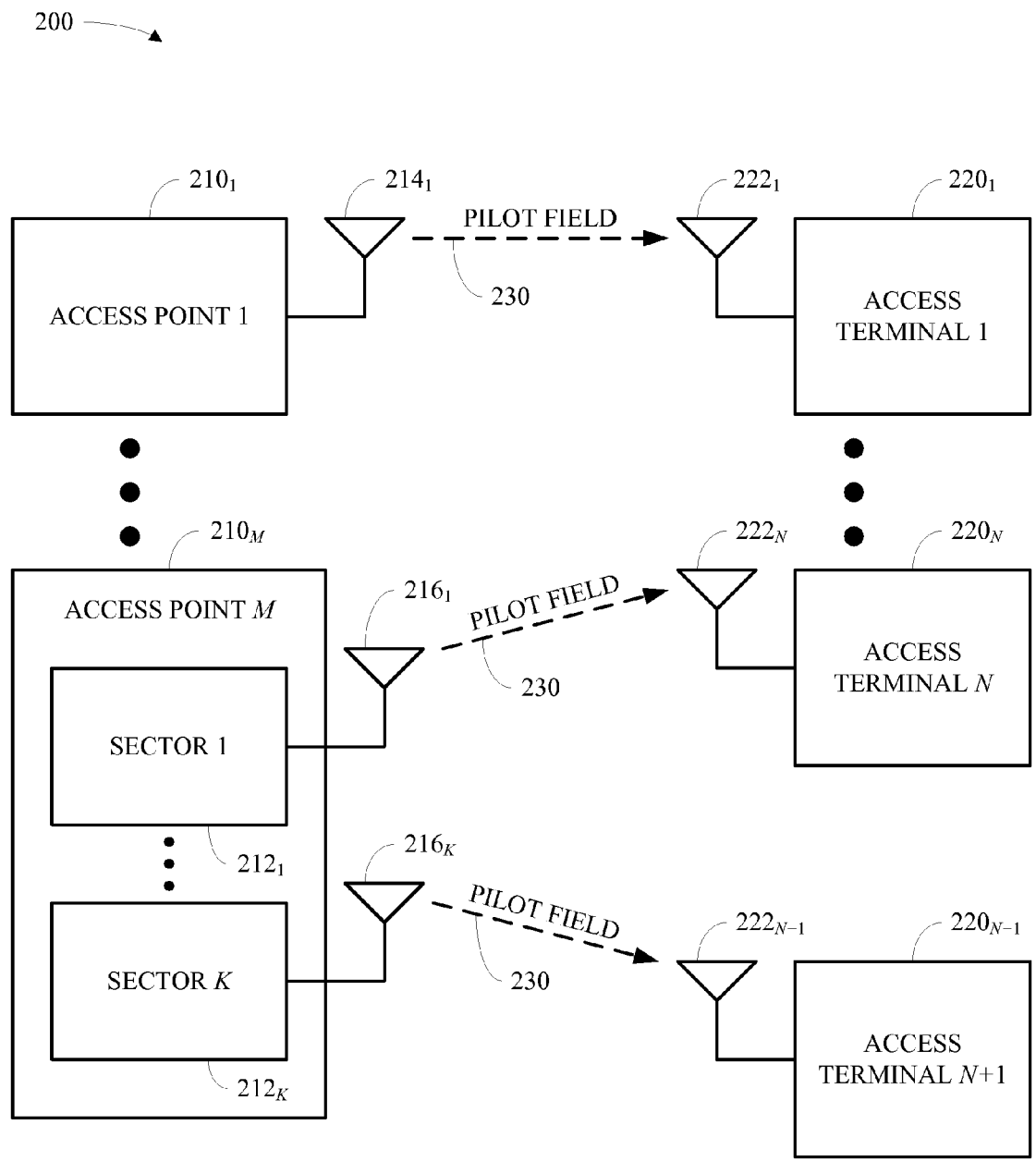
FIG. 2 is a block diagram of a system that facilitates signal acquisition in a wireless communication system in accordance with various aspects.

FIG. 2 is a block diagram of a system 200 that facilitates signal acquisition in accordance with various aspects described herein. In accordance with one aspect, system 200 may include one or more access points 210 and one or more access terminals 220 that may communicate with each other on a forward link and a reverse link. In one example, an access point 210 can communicate directly with an access terminal 220 in a coverage area of system 200 (e.g., a cell 102). Alternatively, one or more access points 210 may include one or more antenna groups 212, each of which may communicate with access terminals 220 in a sector (e.g., a sector 104) of the coverage area corresponding to the respective access point 210. Further, each access point 210 and/or antenna group 212 can include one or more antennas 214-216, and each access terminal 220 can include one or more antennas 222. While only one antenna 214-216 is illustrated at each access point 210 and antenna group 212 and only one antenna 222 is illustrated at each access terminal 220 for brevity, it should be appreciated that any number of antennas could be employed.

A new connection may be established for communication between an access terminal 220 and an access point 210 or antenna group 212 in system 200 by a variety of means. For example, a connection may be established when an access terminal 220 is initially powered on, an access terminal 220 "wakes up" for discontinuous transmission (DTX), an access terminal 220 enters the coverage area of an access point 210 or antenna group 212, or by other suitable means. In accordance with one aspect, an access terminal 220 must obtain information necessary for communication with an access point 210 or antenna group 212 via an acquisition process before such a connection can be established. By way of example, information obtained via the acquisition process may relate to timing and synchronization information for system 200, timing and synchronization information for an access point 210 or antenna group 212, the identity of an access point 210 or antenna group 212, and/or other appropriate information.

In one example, an access point 210 or antenna group 212 can provide the information required by an access terminal 220 for communication in one or more acquisition pilots. These acquisition pilots may then be communicated to an access terminal 220 via a pilot field 230. By way of non-limiting example, a pilot field 230 can be transmitted as one or more OFDM symbols and may be included in a superframe preamble or in one or more physical layer frames of a superframe. Upon receiving a pilot field 230 from an access point 210 or antenna group 212, an access terminal 220 may correlate with respect to one or more acquisition pilots in the pilot field 230 to obtain the information required for communication with the access point 210 or antenna group 212. The correlation performed by an access terminal 220 may be, for example, a direct (i.e., real-time) correlation or a delayed correlation.

In accordance with one aspect, a pilot field 230 can include three acquisition pilots (i.e., TDM1, TDM2, and TDM3). In one example, the first acquisition pilot (TDM1) can be a periodic sequence with a predetermined length corresponding to a number of periods. In another example, TDM1 can be common to all access points 210 and antenna groups 212 in system 200 to provide general timing information for system 200. In such an example, an access terminal 220 may interpret a common TDM1 sequence transmitted from multiple access points 210 and/or antenna groups 212 as multipaths of the same signal. Thus, a common TDM1 signal may additionally be utilized to reduce the effects of interference within system 200. Additionally and/or alternatively, TDM1 may be generated as a time domain sequence or as a frequency domain sequence with a specifically low peak-to-average (PAR) ratio, such as a generalized chirp-like (GCL) or Chu sequence, thereby allowing TDM1 to efficiently be boosted in power.

In accordance with another aspect, the second acquisition pilot (TDM2) and the third acquisition pilot (TDM3) may be of equal length. Further, the length of TDM2 and TDM3 may correspond to the length of one period of TDM1. In one example, TDM2 and TDM3 can be generated by an access point 210 and/or an antenna group 212 based at least in part on an identifier for the generating entity. Accordingly, TDM2 and TDM3 can be utilized to provide identification information for the entity that generated the sequences. Further, TDM2 and TDM3 may also be utilized to provide timing information particular to the entity that generated the sequences. In another example, TDM2 and TDM3 can also be generated using different portions of an identifier for the generating entity in order to allow an access terminal 220 that receives TDM2 and TDM3 to perform a hierarchical search for the access point 210 and/or antenna group 212 that generated the signal. By way of a specific, non-limiting example, TDM2 can be generated using only some bits of an identifier for the generating entity and TDM3 can be generated using all bits of the identifier. In a further example, Walsh sequences can also be used for TDM2 and TDM3 in order to allow an access terminal 220 to efficiently correlate with respect to pilot fields 230 received from many access points 210 and/or antenna groups 212 by using a Walsh-Hadamard transform. A common scrambling code may also be applied to TDM2 and TDM3 to reduce the effect of cross-correlation between pilot fields 230.

Figure 3:
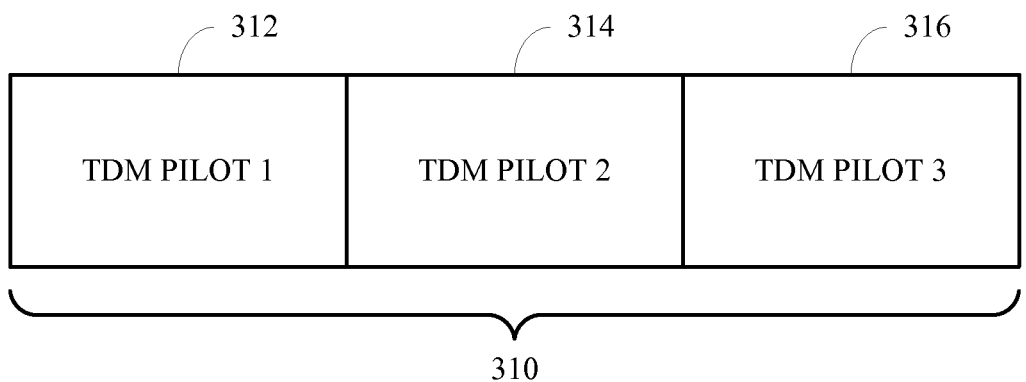
FIG. 3 illustrates an example TDM pilot field in accordance with various aspects.

FIG. 3 is an illustration of an example TDM pilot field 310 in accordance with various aspects. In one example, TDM pilot field 310 may be utilized in connection with a pilot and data transmission scheme for the forward link in a wireless communication system (e.g., system 100). In such a transmission scheme, each base station (e.g., each base station 110) in the system may transmit pilots in frames, superframes, superframe preambles, and/or by any other appropriate means in the forward link. In accordance with one aspect, pilot field 310 can include TDM pilots 312, 314, and 316, each of which may be used for acquisition (e.g., by an access terminal 120).

In one example, TDM Pilot 1 (312) can be a sequence with a total length of $N_{FFT}$ chips. In another example, each sector (e.g., each base station 120 and/or sector 104) in the system may utilize the same sequence for TDM Pilot 1. In such an example, pilot sequences transmitted from different sectors may appear as multipaths of the same sequence to an access terminal that receives the pilot sequences. In addition, the access terminal in such an example may only be required to detect the timing of one pilot sequence in order to determine the timing of the system. Accordingly, utilizing a common sequence for TDM Pilot 1 can allow system timing to be determined with lower complexity than would be required for detecting the timing of multiple sequences, as may be required if a common sequence for TDM Pilot 1 is not used. In accordance with a further aspect, where each sector in the system utilizes a common sequence for TDM Pilot 1, the transmission of TDM Pilot 1 at each sector may be synchronous or asynchronous.

In another example, TDM pilot 1 may be periodic in time or, alternatively, occupy a "comb" in frequency. For example, TDM Pilot 1 may be periodic in a superframe preamble, throughout a superframe, in a frame, or in a frame preamble. TDM Pilot 1 may also be of a predetermined length corresponding to $N_{PERIODS}$ periods, where $N_{PERIODS}$ is a predetermined integer value. In accordance with one aspect, TDM Pilot 1 may be generated with multiple periods to aid in frequency error correction at an access terminal by facilitating the use of techniques such as delayed correlation and/or shorter-size Fourier transforms (FFTs) by the access terminal. In a further example, a pseudo-noise (PN) sequence of length $N_{FFT}/N_{PERIODS}$ can be chosen for each period of TDM Pilot 1. Alternatively, a GCL or Chu sequence can be used in place of the PN sequence. In addition, Hybrid Phase Shift Key (HPSK) scrambling may be used for TDM Pilot 1 in order to reduce the peak-to-average ratio (PAR) of TDM Pilot 1, thereby allowing more efficient power boosting.

In accordance with a further aspect, TDM Pilot 2 (314) and TDM Pilot 3 (316) can be sector-dependent PN sequences. In one example, TDM Pilot 2 and TDM Pilot 3 can be chosen in a manner that enables hierarchical search. For example, TDM Pilot 2 can be generated based on a portion of bits of a sector ID, while TDM Pilot 3 can be generated based on all bits of the sector ID. Thus, TDM Pilot 2 may be common to a portion of sectors in the system while TDM Pilot 3 is unique to each individual sector. In another example, HPSK scrambling may also be used for TDM Pilot 2 and TDM Pilot 3 in order to reduce the PAR of the pilots and to increase the efficiency of power boosting thereon. In another example, Walsh sequences may also be used for TDM Pilot 2 and TDM Pilot 3, thereby allowing an access terminal to efficiently correlate with pilot sequences from many sectors by, for example, using a Walsh-Hadamard transform. Additionally, in order to combat cross-correlation properties of Walsh sequences, a scrambling code may be applied to the Walsh codes for TDM Pilot 2 and TDM Pilot 3 that is independent of the sectors in the system.

It should be appreciated that the sizes of TDM pilots 312-316 may be the same as or different from the sizes of data symbols utilized in the system. Further, it should be appreciated that a cyclic prefix or zero-padding may or may not be used for TDM pilots 312-316. Further, as used herein, a PN sequence may be any sequence of chips that may be generated in any manner. By way of non-limiting example, a PN sequence may be generated with a generator polynomial. As an additional example, the PN sequence for each base station (e.g., each sector) may also be a scrambling code used to randomize data. In this example, TDM pilots 312-316 may be generated by applying the scrambling code to a sequence of all ones or all zeros.

In accordance with one aspect, a terminal may use TDM Pilot 1 to detect for the presence of a signal, obtain coarse timing, and/or estimate frequency error. The terminal may then use TDM Pilots 2 and 3 to identify a specific base station transmitting the TDM pilots and to obtain more accurate timing or time synchronization. More generally, detection may comprise detecting TDM Pilot 1, detecting TDM Pilot 2 if TDM Pilot 1 is detected, and then finally detecting TDM Pilot 3 if TDM Pilot 2 is detected. In one example, TDM Pilot 1 can be periodic in the time domain, thereby allowing a terminal to correlate against the periodicity of TDM Pilot 1 (e.g., the number of periods).

By way of specific, non-limiting example, a terminal may correlate with respect to TDM Pilot 1 as follows. First, the terminal may define a function X(k), where:

$$X(k)=0 \text{ unless } (k \bmod N_{PERIODS})=0 \quad (1)$$

Thus, in an example where $N_{PERIODS}=2$, only even-numbered subcarriers will have non-zero values. This can be expressed as follows:

$$X(2k)=S_{TDM1}(k) \text{ and } X(2k+1)=0 \quad (2)$$

where TDM1 has two periods, each period denoted by $S_{TDM1}$(t). The receiver can then utilize the above by employing an FFT of size $N_{FFT}/2$ to correlate against each period of TDM1. The function y(t) can then be defined as the received sequence in a time window of length $N_{FFT}/2$, and the function Y(f) can be defined as the corresponding FFT of size $N_{FFT}/2$. By using these functions, the terminal may find the normalized correlation with $S_{TDM1}$(t) in the FFT window by using the following equation:

$$\text{Corr}(t) = \sum_{i=0}^{N_{FFT}/2} S^*_{TDM1}(t+i)y(t+i). \quad (3)$$

The terminal can then non-coherently combine the correlation obtained in Equation (3) with a correlation obtained from the next FFT window, i.e., Corr(t+$N_{FFT}/2$). The combined correlation then may also be normalized by the total received power. If the combined correlation is greater than a predetermined threshold, the terminal may claim that one path of TDM1 has been detected. The terminal may then use this timing hypothesis to successively correlate TDM Pilot 2 and TDM Pilot 3. If a similar combined correlation for TDM Pilot 2 and/or TDM Pilot 3 is less than a predetermined threshold, the terminal can claim that the corresponding pilot(s) has not been detected and move on to the next timing hypothesis (e.g., for t=t+1), wherein the above procedure may be repeated.

In another non-limiting example, the terminal may compute the above correlations for TDM Pilot 1 efficiently using a FFT-based approach. For example, each of the correlations Corr(t) to Corr(t+$N_{FFT}/2-1$) may be approximated in a single pass by computing IFFT[$S_{TDM1}$(f)Y(f)]. The terminal can then compare each of values, or alternatively a selected number of strong paths, to a predetermined threshold. Any time samples for which the normalized correlation exceeds the threshold may then be used for the detection of TDM Pilot 2 and TDM Pilot 3. Additionally, in the specific, non-limiting example where TDM Pilot 2 and TDM Pilot 3 are designed using Walsh sequences, a low-complexity Walsh-Hadamard transform may be used to correlate sequences received from many sectors at once.

In another example, for each timing estimate provided by TDM Pilot 1, as well as each possible sector hypothesis, a corresponding TDM Pilot 2 sequence may be correlated with the received sequence. If the correlation is greater than a predetermined threshold, the detection process may proceed to correlation for TDM Pilot 3, which may be identical to the correlation for TDM Pilot 2. If the correlation of TDM Pilot 3 also passes a predetermined threshold at a certain timing hypothesis, the terminal may declare that the sector has been acquired with the fine timing of the sector equal to the timing hypothesis.

In accordance with one aspect, TDM pilots 312-316 can also be used for frequency error correction. For example, in the absence of frequency error and noise, Corr(t) would be the same as Corr(t+$N_{FFT}/2$). However, frequency error may be present at a terminal due to, for example, a clock mismatch between an access point and the terminal causing a phase ramp to be applied to the received signal at the terminal. Thus, the terminal can compare the phases of Corr(t) and Corr(t+$N_{FFT}/2$) and estimate the frequency error therefrom. Additionally, the terminal may then also correct for the frequency error by applying a counter-balancing phase ramp.

Figure 4A:
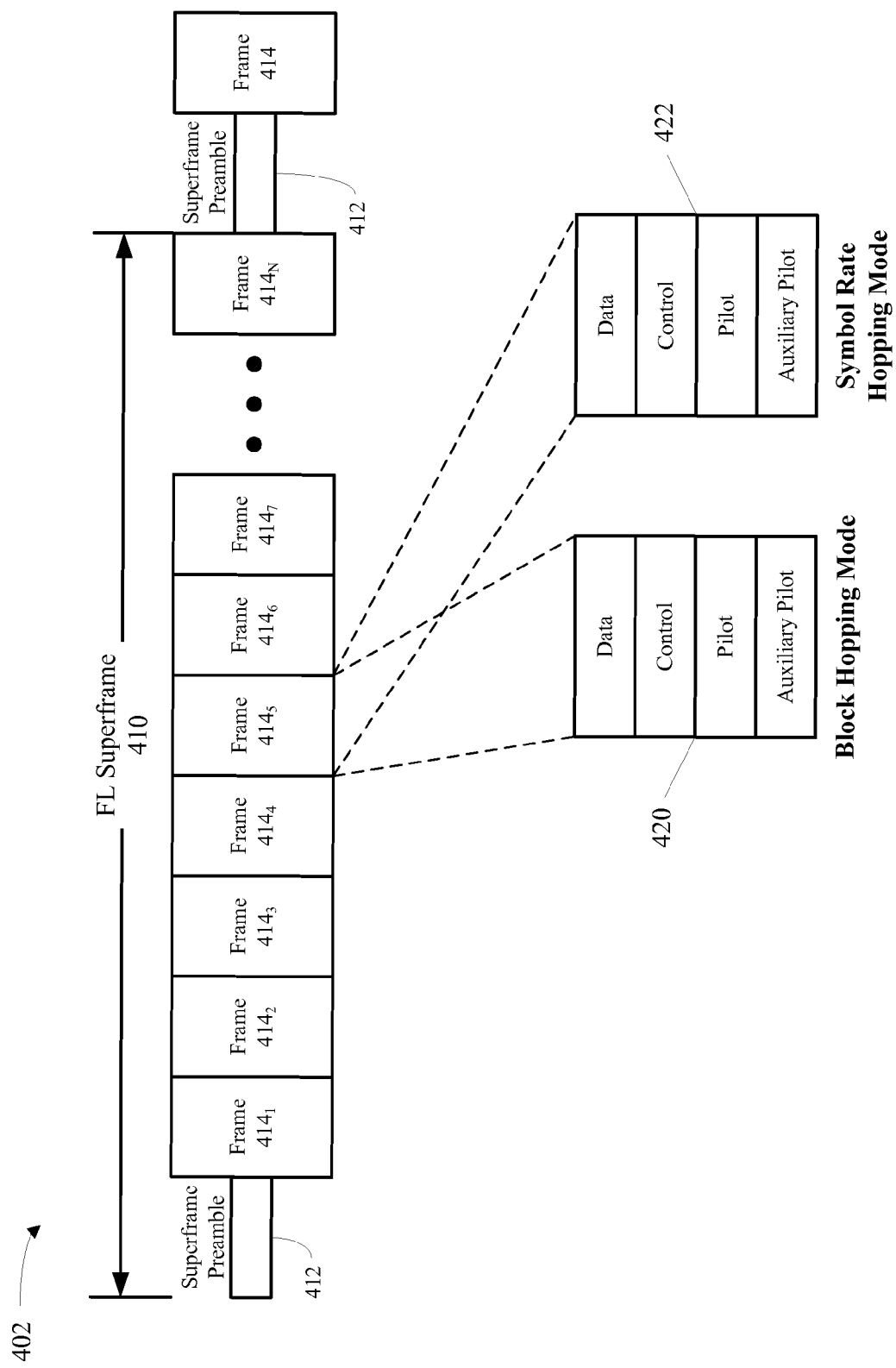
FIGS. 4A-4B illustrate example superframe structures for a multiple access wireless communication system in accordance with various aspects.

FIG. 4A illustrates an example superframe structure 402 for a multiple access wireless communication system (e.g., system 100) utilizing frequency division duplexing (FDD). In one example, a superframe preamble 412 is transmitted at the beginning of each superframe 410. Alternatively, superframe preamble 412 may be interspersed within superframe 410 as a preamble and a midamble. While superframe 410 is illustrated as a forward link (FL) superframe, it should be appreciated that superframe 410 could alternatively be a reverse link superframe.

In one example, each superframe 410 can consist of a superframe preamble 412 followed by a series of frames 414. In FDD structure 402, a reverse link transmission and a forward link transmission may occupy different frequencies such that transmissions on the forward and reverse links are substantially overlapping on any given frequency subcarrier. In accordance with one aspect, a superframe preamble 412 may span one carrier within the overall system bandwidth and may hop for each superframe 410, a multiple number of superframes 410, a fixed time duration, or another appropriate duration. Further, superframe preamble 412 may hop according to a hop sequence or pattern. The hop sequence or pattern may be determined by an access terminal (e.g., a terminal 120), for example, from an identifier for an access point (e.g., a base station 110) such as a (PN) sequence. Alternatively, a superframe preamble 412 may not hop and may span all carriers within the system bandwidth or only one carrier.

In another example, superframe preamble 412 can contain a pilot channel that can include pilots that may be used for channel estimation by access terminals. Further, superframe preamble 412 can include a broadcast channel that includes configuration information that an access terminal (e.g., a terminal 120) may utilize to demodulate information contained in a forward link frame 414. Additionally and/or alternatively, superframe preamble 412 may include acquisition information such as timing and other information sufficient for an access terminal to communicate, power control information, and/or offset information. Thus, superframe preamble 412 may contain one or more of a common pilot channel; a broadcast channel, including system and configuration information; an acquisition pilot channel, used to acquire timing and other information; and a sector interference channel, including indicators from a sector of its measured interference with respect to other sectors. In one example, the pilot channel may include TDM Pilots 1, 2, and 3 (e.g., TDM pilots 312-316). Alternatively, the TDM pilots may be in superframe preamble 412 in a non-channelized fashion or in another portion of superframe 410.

In accordance with one aspect, superframe preamble 412 can be followed by a sequence of frames 414. Each frame 414 can consist of a uniform or non-uniform number of OFDM symbols and a uniform or non-uniform number of subcarriers that may simultaneously be utilized for transmission. In one example, each frame 414 may operate according to a symbol rate hopping mode 422, wherein one or more non-contiguous OFDM symbols are assigned to a terminal on a forward link or reverse link. Alternatively, each frame 414 may operate according to a block hopping mode 420, wherein terminals may hop within a block of OFDM symbols. In both block hopping mode 420 and symbol rate hopping mode 422, blocks or OFDM symbols may or may not hop between frames 414.

In accordance with another aspect, superframe 410 may not utilize a superframe preamble 412. In one alternative, a preamble may be provided for one or more frames 414 that includes equivalent information to superframe preamble 412. In another alternative, a broadcast control channel may be utilized to contain some or all of the information of superframe preamble 412. Other information may additionally be contained in a preamble or control channel of a frame 414.

Figure 4B:
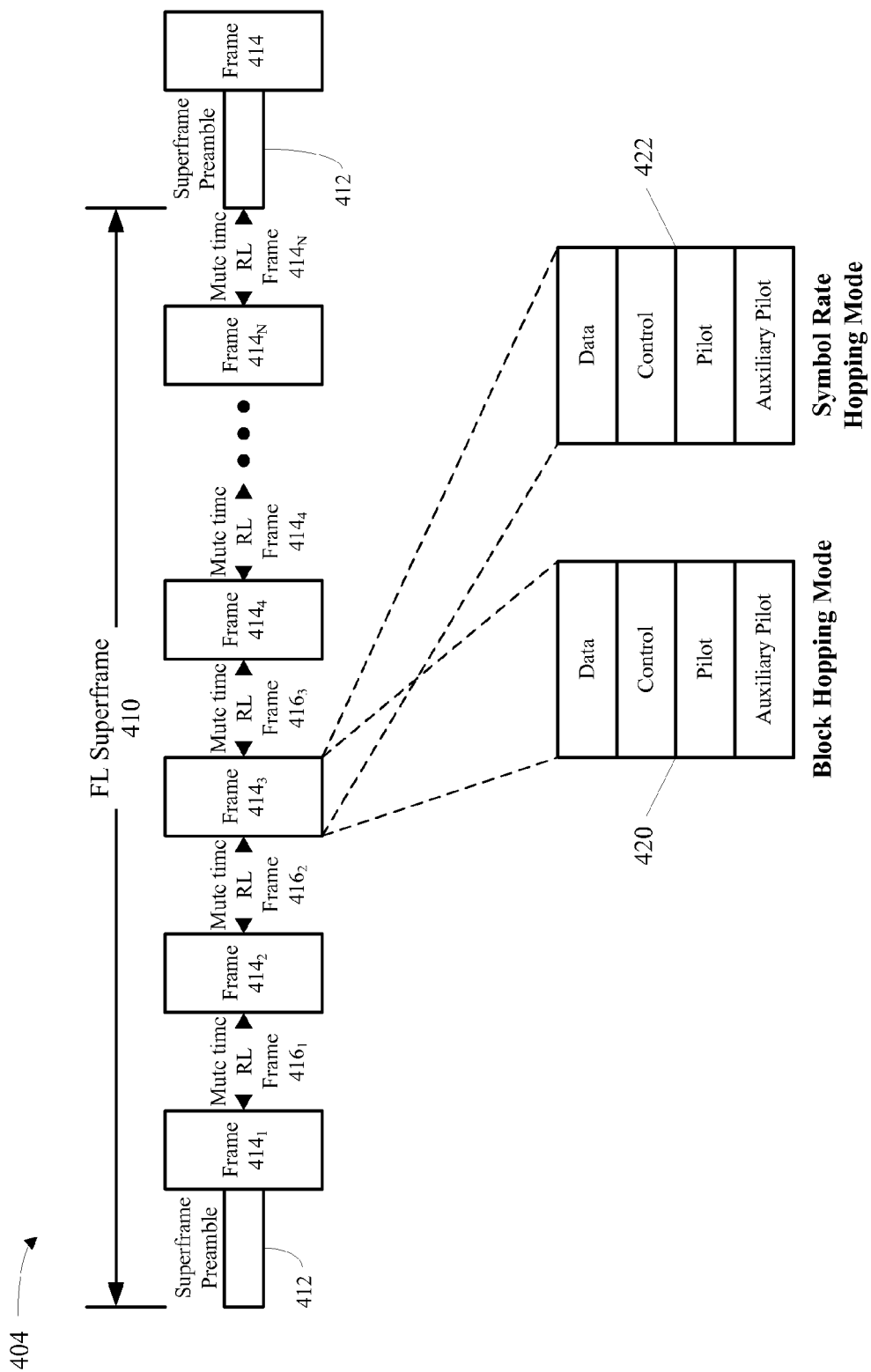

FIG. 4B illustrates an example superframe structure 404 for a multiple access wireless communication system utilizing time division duplexing (TDD). In one example, a superframe preamble 412 can be transmitted at the beginning of each superframe 410 that is substantially similar in construction and performance to superframe preamble 412 in FDD structure 402. In accordance with one aspect, each superframe preamble 412 in TDD structure 404 can be followed by a sequence of forward link frames 414 and reverse link frames 416. Forward link frames 414 and reverse link frames 416 may be divided in time such that a predetermined number of forward link frames 414 are continuously transmitted prior to allowing transmission of a predetermined number of reverse link frames 416. As illustrated in superframe structure 404, a forward link superframe 410 will experience mute time during the transmission of one or more reverse link frames 416. Similarly, it should be appreciated that a reverse link superframe would experience mute time during the transmission of forward link frames 414. Further, it should be appreciated that any number of forward link frames 414 and any number of reverse link frames 416 may be continuously transmitted in superframe structure 404 and that said numbers of frames may vary within a given superframe or between superframes.

Further, each forward link frame 414 can consist of a uniform or non-uniform number of OFDM symbols and a uniform or non-uniform number of subcarriers that may simultaneously be utilized for transmission in a similar manner to frames 414 in FDD structure 402. In one example, each forward link frame 414 may operate according to a symbol rate hopping mode 422, wherein one or more non-contiguous OFDM symbols are assigned to a terminal on a forward link or reverse link. Alternatively, each forward link frame 414 may operate according to a block hopping mode 420, wherein terminals may hop within a block of OFDM symbols. In both block hopping mode 420 and symbol rate hopping mode 422, blocks or OFDM symbols may or may not hop between forward link frames 414.

In accordance with one aspect, superframe 410 may not utilize a superframe preamble 412. In one alternative, a preamble may be provided for one or more frames 414 that includes equivalent information to superframe preamble 412. This information may include, for example, TDM Pilots 1, 2, and 3. In another alternative, a broadcast control channel may be utilized to contain some or all of the information of superframe preamble 412. Other information may additionally be contained in a preamble or control channel of a frame 414.

Figure 5A:
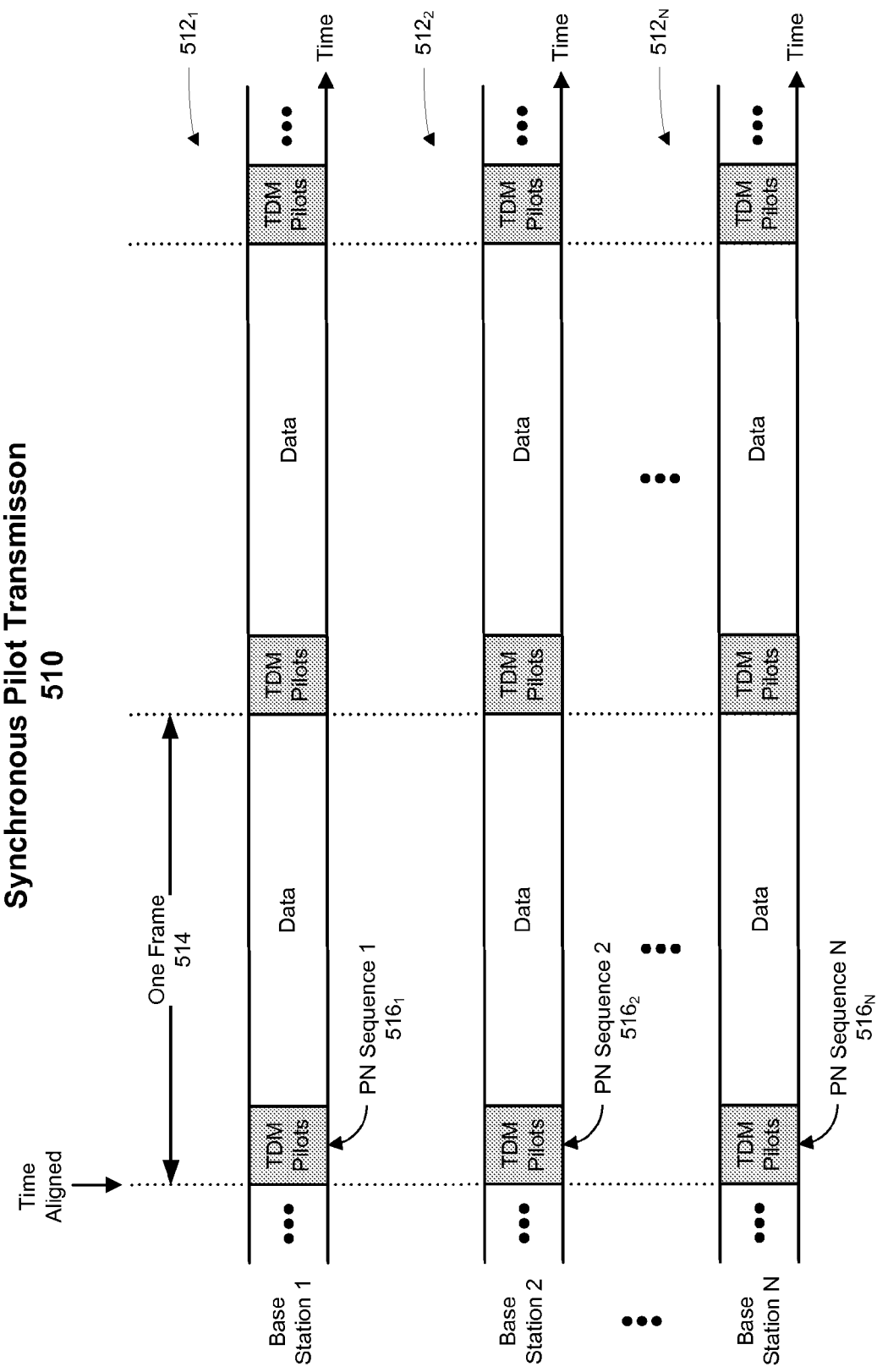
FIG. 5A illustrates an example synchronous forward link pilot transmission scheme in accordance with various aspects.

FIG. 5A illustrates an example synchronous forward link pilot transmission scheme 510 in accordance with various aspects. In accordance with one aspect, a wireless communication system (e.g., system 100) may use transmission scheme 510 when each base station (e.g., each base station 110) in the system is synchronous and transmits its TDM pilots (e.g., TDM pilots 312-316) at the same time. As illustrated by transmission scheme 510, each base station in the system can transmit TDM pilots in the form of a PN sequence 516 over one or more frames 514 in a transmission timeline 512 corresponding to each respective base station. Thus, a terminal (e.g., a terminal 120) may receive TDM pilots from all base stations in the system at approximately the same time. Any timing skew between the base stations could be due to differences in propagation delays and/or other factors. In accordance with one aspect, synchronizing the TDM pilots from different base stations allows interference by TDM pilots from one base station on data transmissions by other base stations to be avoided. By avoiding such interference, data detection performance in the system may be improved. Further, interference from the data transmissions on the TDM pilots may similarly be avoided, thereby improving acquisition performance.

FIG. 5B illustrates an example staggered forward link pilot transmission scheme 520 in accordance with various aspects. Transmission scheme 520 may be utilized, for example, when the base stations in the system are synchronous but transmit their TDM pilots at different times within frames 524 of their respective transmission timelines 522 so that the TDM pilots are staggered in time. In one example, the base stations may consequently be identified by the time at which they transmit their TDM pilots. In accordance with one aspect, the same PN sequence 526 may be used for all base stations. Because each base station can utilize the same PN sequence 526, the processing required for signal acquisition at each terminal may be significantly reduced. However, pilot transmissions from each base station may observe interference from data transmissions from neighboring base stations.

Figure 5C:
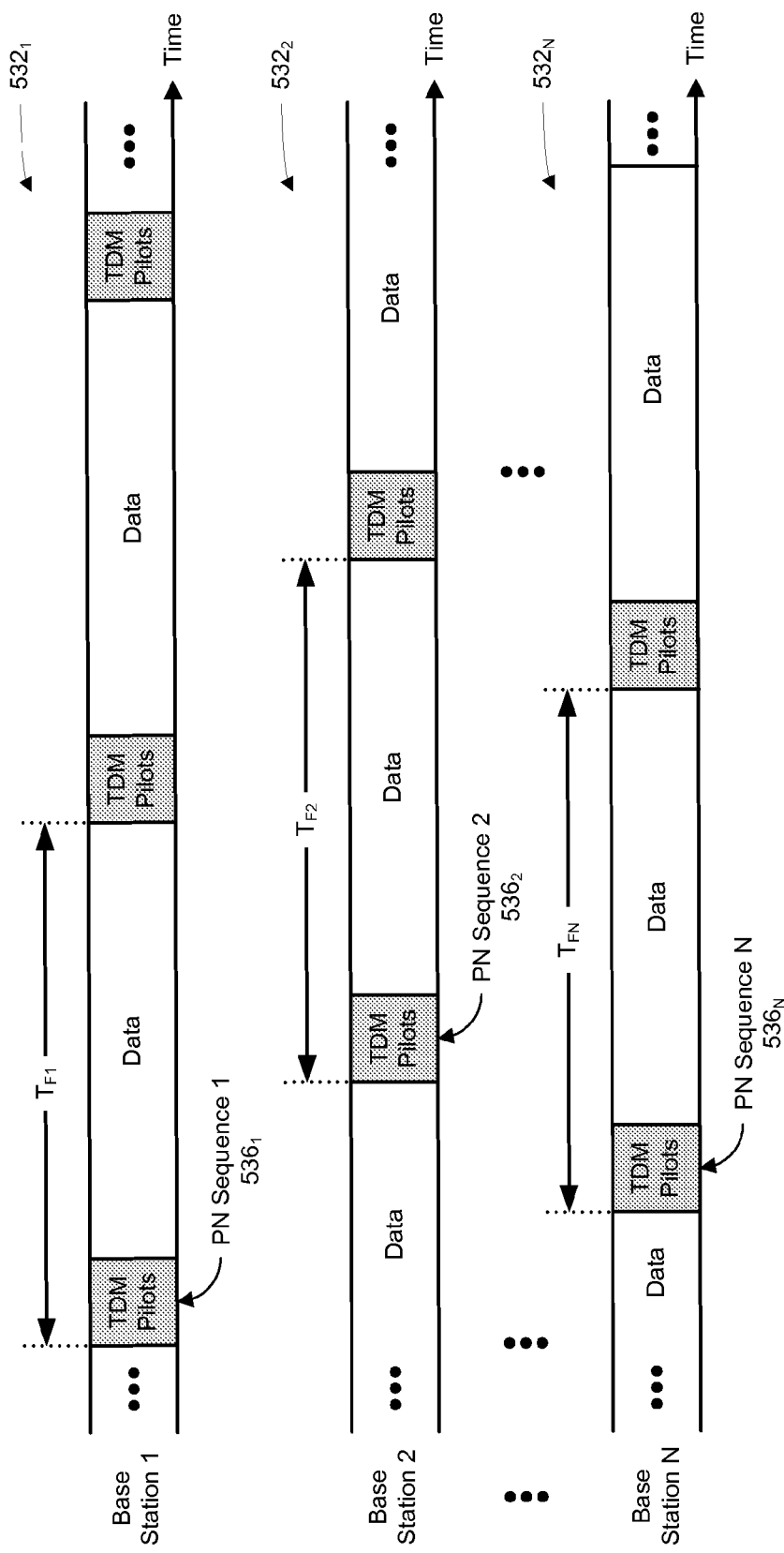
FIG. 5C illustrates an example asynchronous forward link pilot transmission scheme in accordance with various aspects.

FIG. 5C illustrates an example asynchronous forward link pilot transmission scheme 530 in accordance with various aspects. Transmission scheme 530 may be utilized, for example, when the base stations in the system are asynchronous and each base station transmits its TDM pilots 536 on its corresponding transmission timeline 522 based on its independent timing. Thus, TDM pilots from different base stations may arrive at different times at a terminal.

Figure 5D:
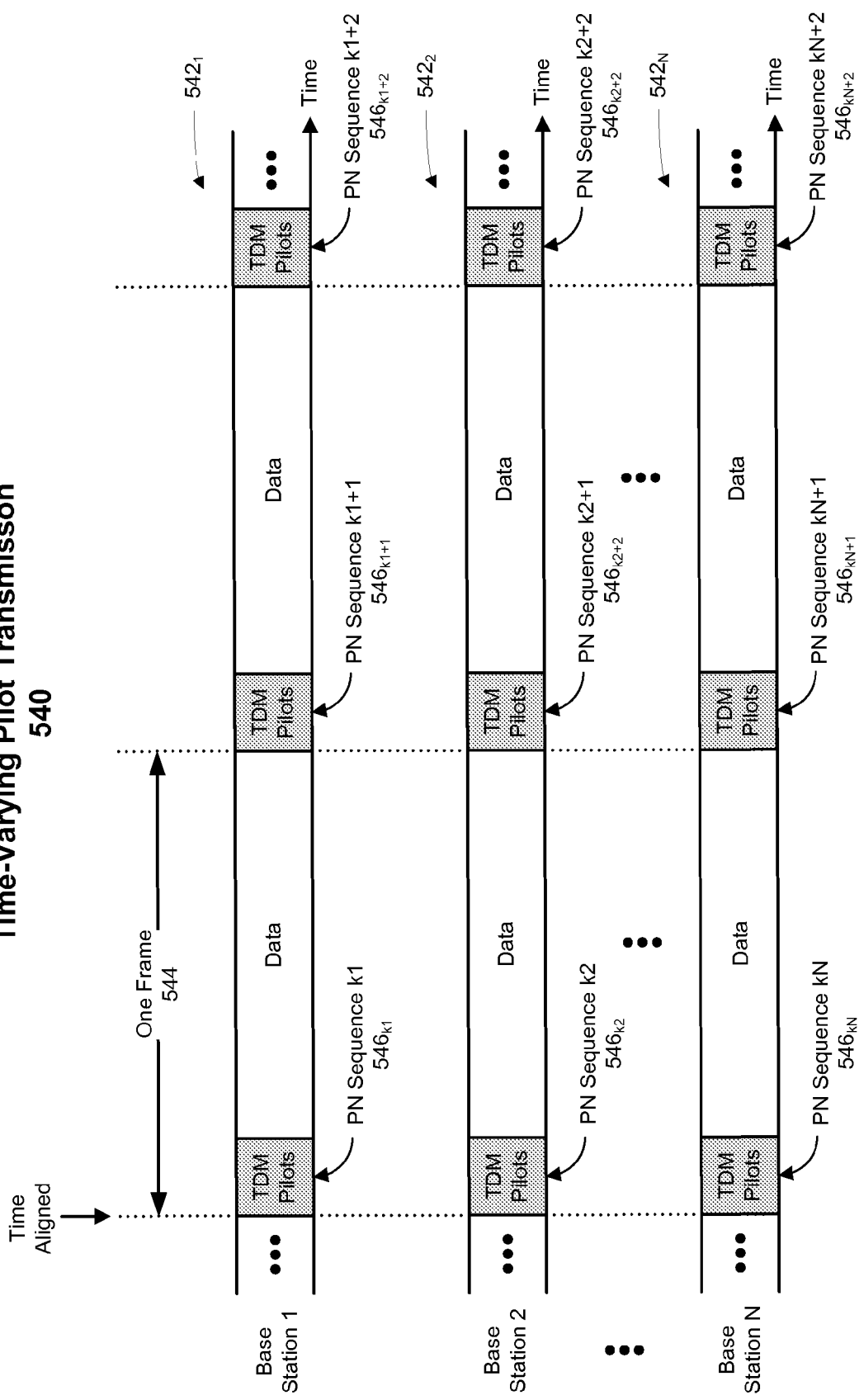
FIG. 5D illustrates an example time-varying forward link pilot transmission scheme in accordance with various aspects.

FIG. 5D illustrates an example time-varying forward link pilot transmission scheme 540 in accordance with various aspects. Transmission scheme 540 may be utilized, for example, by assigning each base station in the system a set of $M_B$ PN1 sequences 546 for TDM Pilot 1, where $M_B>1$. Each base station can then use one PN1 sequence 546 for each frame 544 in its respective transmission timeline 542 and cycle through the $M_B$ PN1 sequences in $M_B$ frames 544. In one example, time-varying transmission scheme 540 can be used as an alternative to synchronous transmission scheme 510. As noted above with respect to synchronous transmission scheme 510, TDM pilot transmissions from each base station may observe the same interference from TDM pilot transmissions from neighboring base stations in each frame 514. Thus, averaging the TDM pilots over multiple frames 514 may not provide averaging gain since the same interference is present in each frame. To provide averaging gain, the interference can be varied by changing the TDM pilots across frames 544 as illustrated by time-varying transmission scheme 540.

In one example, different base stations can be assigned different sets of $M_B$ PN1 sequences 546. The set of $M_B$ PN1 sequences 546 assigned to each base station may additionally be viewed as a "long code" that spans across multiple frames 544. Accordingly, each of the $M_B$ PN1 sequences 546 in each set may be considered as a segment of the long code and may be generated with a different seed for the long code. To reduce processing complexity at a terminal, the same long code may be used for all base stations, and each base station may be assigned a different offset of the long code. For example, base station i may be assigned a long code offset of ki, where ki is within a range of 0 through $M_B-1$. Thus, the PN1 sequences 546 for base station i starting at a designated frame 544 may then be given as $PN1_{ki}$, $PN1_{ki-1}$, $PN1_{ki+2}$, and so on. Once a PN1 sequence 546 or long code offset is detected, the detected PN1 sequence 546 or long code offset can then be used along with the frame in which the PN1 sequence 546 was detected relative to the designated frame to identify the set of PN1 sequences 546 to which the detected PN1 sequence 546 belongs.

Figure 6:
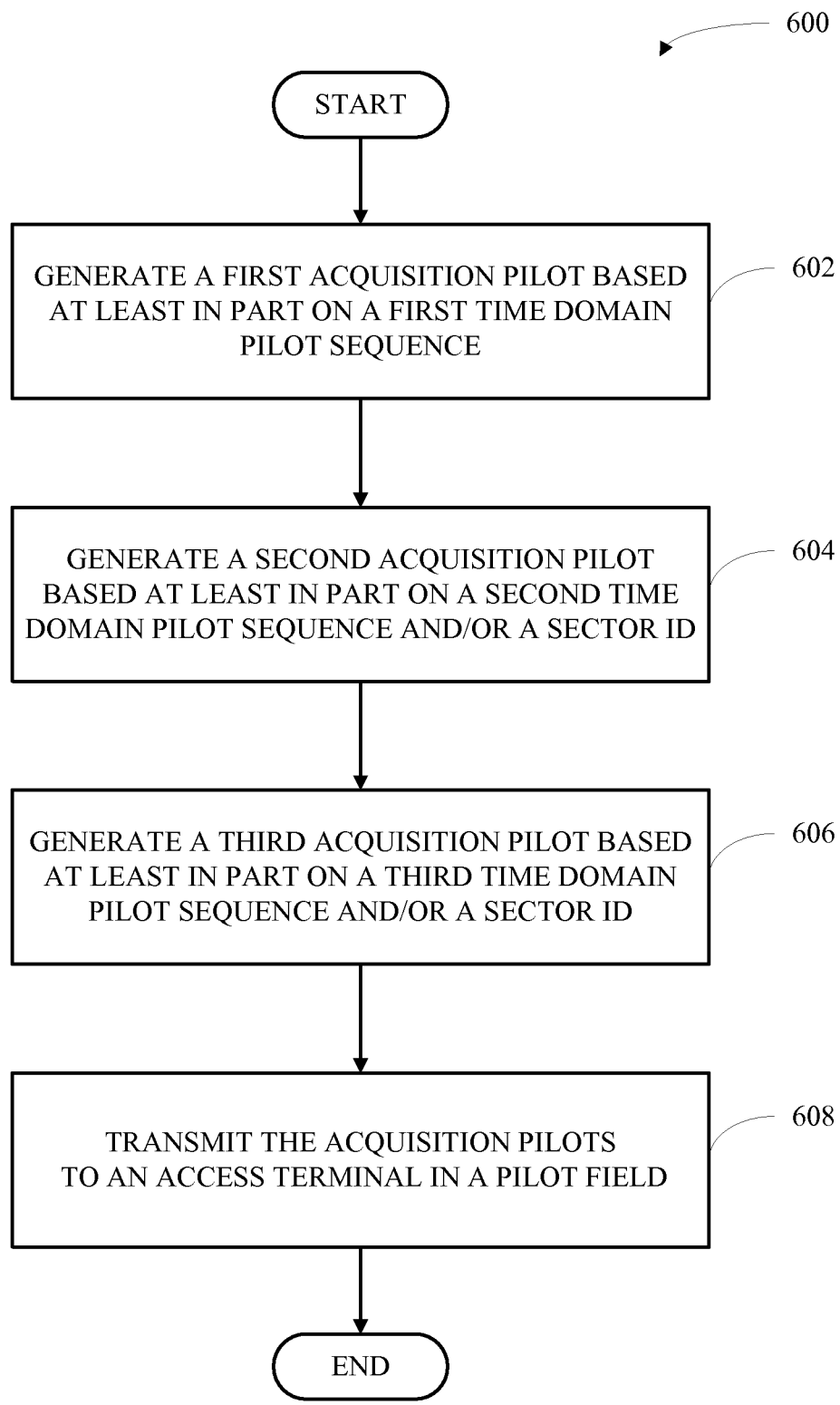
FIG. 6 is a flow diagram of a methodology for generating and transmitting acquisition pilots in a wireless communication system.
Figure 7:
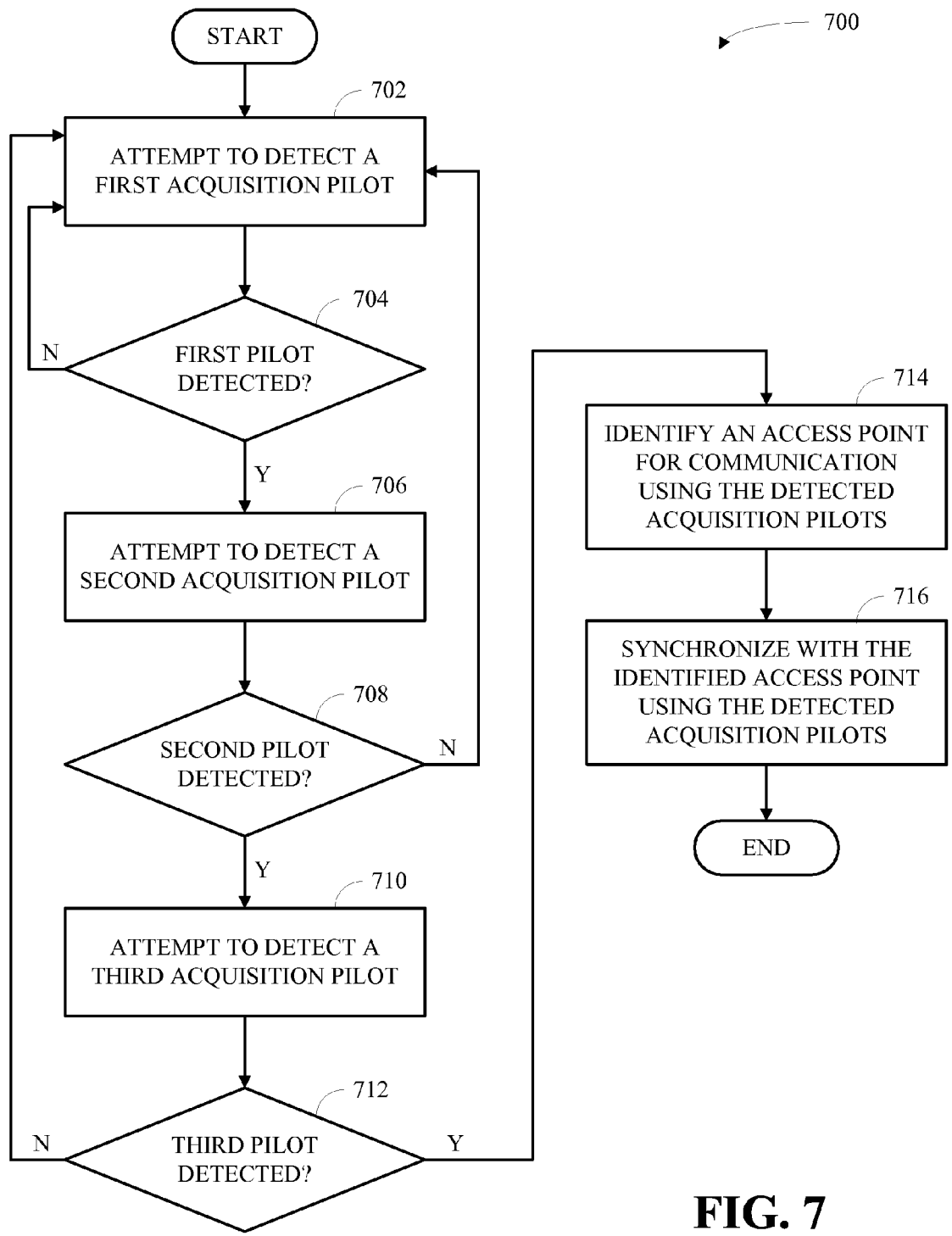
FIG. 7 is a flow diagram of a methodology for signal acquisition in a wireless communication system.

Referring to FIGS. 6-7, methodologies for signal acquisition in a wireless communication system are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 6, illustrated is a methodology 600 for generating and transmitting acquisition pilots (e.g., TDM pilots 312-316) in a wireless communication system (e.g., system 200). Methodology 600 may be performed, for example, by a base station (e.g., a base station 210) and/or an antenna group (e.g., an antenna group 212) in the system. Methodology 600 begins at block 602, wherein a first pilot sequence (e.g., TDM Pilot 1 (312)) is generated based on a first time domain pilot sequence. In one example, each entity in the system that performs methodology 600 may generate a first acquisition pilot based on a common first pilot sequence at block 602. This may be done, for example, to minimize the effects of interference at one or more terminals (e.g., access terminals 220) in the system and/or to allow the first pilot sequence to provide general timing information for the system. Further, the first acquisition pilot may be generated in the time domain, or alternatively it may be generated in the frequency domain such that it has a peak-to-average ratio below a predetermined threshold to allow efficient power boosting of the sequence.

After the first acquisition pilot is generated at block 602, methodology 600 proceeds to block 604, wherein a second acquisition pilot (e.g., TDM Pilot 2 (314)) is generated based on a second time domain pilot sequence. Methodology 600 may then further proceed to block 606, wherein a third acquisition pilot (e.g., TDM Pilot 3 (316)) is generated based on a third time domain pilot sequence. In one example, the second and third acquisition pilots may be respectively generated at blocks 604 and 606 additionally based on a sector ID (e.g., an identifier for a base station 210 or access terminal 212 performing methodology 600). By generating the second and third acquisition pilots using a sector ID, the second and third acquisition pilots may provide identity information for the entity that generated the pilots. Further, the second and third pilots may also be generated such that a terminal that receives the pilots can perform a hierarchical search for the entity that created the pilots. For example, the second pilot may be based on a portion of bits in a sector ID, and the third pilot may be based on all bits of the sector ID. In another example, the second and third pilots may be generated in the time domain, or alternatively they may be generated in the frequency domain in a similar manner to the first pilot generated at block 602. After the first, second, and third pilots are respectively generated at blocks 602, 604, and 606, they may be transmitted in a pilot field (e.g., a pilot field 230) to a terminal at block 608.

FIG. 7 illustrates a methodology 700 for signal acquisition in a wireless communication system (e.g., system 200). Methodology 700 may be performed, for example, by a terminal (e.g., an access terminal 220) in the system. Methodology 700 begins at block 702, wherein an attempt is made to detect a first acquisition pilot. Next, a determination is made at block 704 as to whether the first pilot has been detected. This determination may be made, for example, by using the algorithms for signal detection and timing hypothesis formulation described above with respect to FIG. 3. If it is determined in block 704 that a first pilot has not been detected, methodology 700 returns to block 702 to continue searching for a first pilot.

If, however, a first pilot is detected, methodology proceeds to block 706, wherein an attempt is made to detect a second acquisition pilot. In one example, the detection attempt performed at block 706 can involve searching an estimated pilot field corresponding to a detected first pilot. A determination is then made at block 708 as to whether a second pilot has been detected. If the second pilot has not been detected, methodology 700 returns to block 702 to search for a new pilot field. If a second pilot is detected, an attempt may then be made to detect a third acquisition pilot at block 710. In one example, the detection attempt performed at block 710 can involve searching the same estimated pilot field utilized at block 706. Methodology 700 then proceeds to block 712, wherein a determination is made as to whether a third pilot has been detected. If the third pilot has not been detected, methodology 700 may return to block 702 in order to search for new pilots.

In accordance with one aspect, if it is determined at block 712 that the third pilot has been detected, an entity performing methodology 700 can then initiate communication with an access point based on acquisition information contained in the three detected acquisition pilots. More specifically, methodology 700 may proceed to block 714 after a positive determination at block 712, wherein an access point is identified for communication using the detected pilots. The access point identified at block 714 may be, for example, an access point that transmitted the pilots received at blocks 702-712. In one example, the pilots may contain information relating to an identifier for the access point, and the access point may be identified based on this information. Methodology 700 can then conclude at block 716, wherein an entity performing methodology 700 may synchronize with the access point identified at block 714 based on the detected pilots. In one example, the pilots received at blocks 702-712 may contain information regarding the timing of the system and/or the timing of the identified access point, and synchronization with the identified access point may be achieved based on this information.

Figure 8:
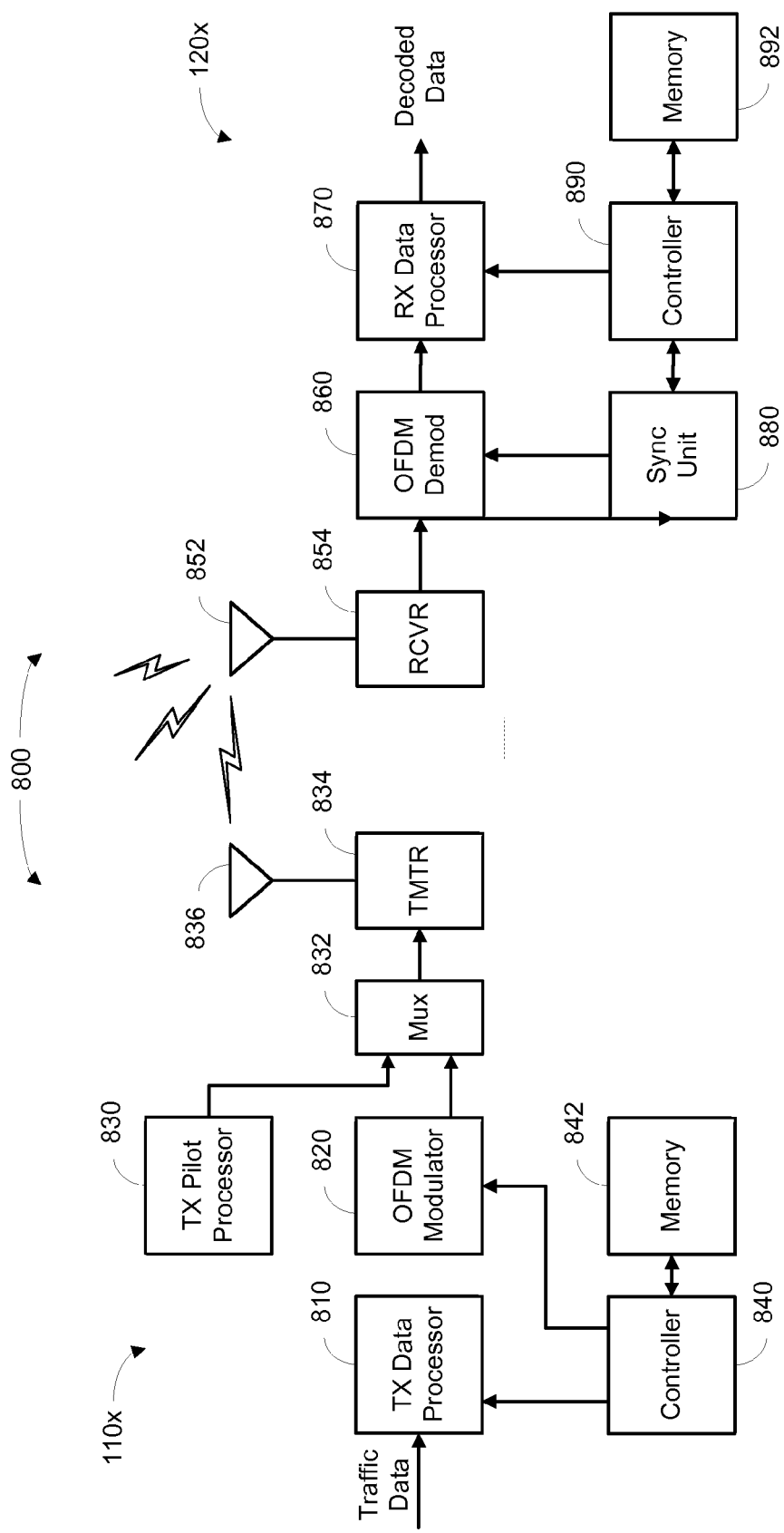
FIG. 8 is a block diagram illustrating an example wireless communication system in which one or more embodiments described herein may function.

Referring now to FIG. 8, a block diagram illustrating an example wireless communication system 800 in which one or more embodiments described herein may function is provided. In one example, system 800 can include a base station 110x and a terminal 120x, which may correspond to a base station 110 and a terminal 110 in system 100. In accordance with one aspect, base station 110x may include a TX data processor 810. TX data processor 810 may receive one or more types of data (e.g., traffic, packet, overhead, and/or control data) and process (e.g., encode, interleave, and/or symbol map) the received data to generate data symbols. As used herein, a "data symbol" refers to a modulation symbol for data and a "pilot symbol" refers to a modulation symbol for a pilot (which may be, for example, data known a priori by both base station 110x and terminal 120x). Further, as used herein and generally in the art, a modulation symbol is a complex value for a point in a signal constellation for a modulation scheme (e.g., M-PSK, M-QAM, . . . ). An OFDM modulator 820 may then multiplex the data symbols onto one or more proper subbands and perform OFDM modulation on the multiplexed symbols to generate OFDM symbols.

In one example, a TX pilot processor 830 at base station 110x can generate TDM pilots (e.g., TDM pilots 312-316) in the time domain or in the frequency domain. A multiplexer (Mux) 832 can then receive and multiplex the TDM pilots from TX pilot processor 830 with the OFDM symbols from OFDM modulator 820 to provide a stream of samples to a transmitter unit (TMTR) 834. Transmitter unit 834 may convert the sample stream into analog signals and further condition (e.g., amplify, filter, and/or frequency upconvert) the analog signals to generate a modulated signal. Base station 110x may then transmit the modulated signal from an antenna 836 to one or more terminals 120x in system 800.

In accordance with another aspect, terminal 120x may receive transmitted signals from base station 110x as well as one or more other base stations via an antenna 852. One or more received signals may then be provided to a receiver unit (RCVR) 854, which can condition (e.g., filter, amplify, frequency downconvert, and/or digitize) each received signal to generate a stream of received samples. A synchronization (sync) unit 880 may obtain the received samples from receiver unit 854 and perform acquisition to detect for signals from one or more base stations and further determine the timing of each detected base station. Sync unit 880 may also provide timing information to an OFDM demodulator 860 and/or a controller 890.

OFDM demodulator 860 at terminal 120x may perform OFDM demodulation on the received samples based on timing information from sync unit 880 to obtain received data and pilot symbols. Additionally, OFDM demodulator 860 may also perform detection and/or matched filtering on the received data symbols with a channel estimate (e.g., a frequency response estimate) to obtain detected data symbols that are estimates of the data symbols sent by base station 110x. OFDM demodulator 860 may then provide the detected data symbols to a receive (RX) data processor 870, which may process (e.g., symbol demap, deinterleave, and/or decode) the detected data symbols and provide decoded data. RX data processor 870 and/or controller 890 may additionally use timing information provided by sync unit 880 to recover different types of data sent by base station 110x.

In one example, the processing by OFDM demodulator 860 and RX data processor 870 located at terminal 120x can be generally complementary to the processing by OFDM modulator 820 and TX data processor 810 located at base station 110x. Further, controllers 840 and 890 may respectively direct operation at base station 110x and terminal 120x. Memory units 842 and 892 may also be respectively provided for base station 110x and terminal 120x to provide storage for program codes and data respectively used by controllers 840 and 890.

Figure 9:
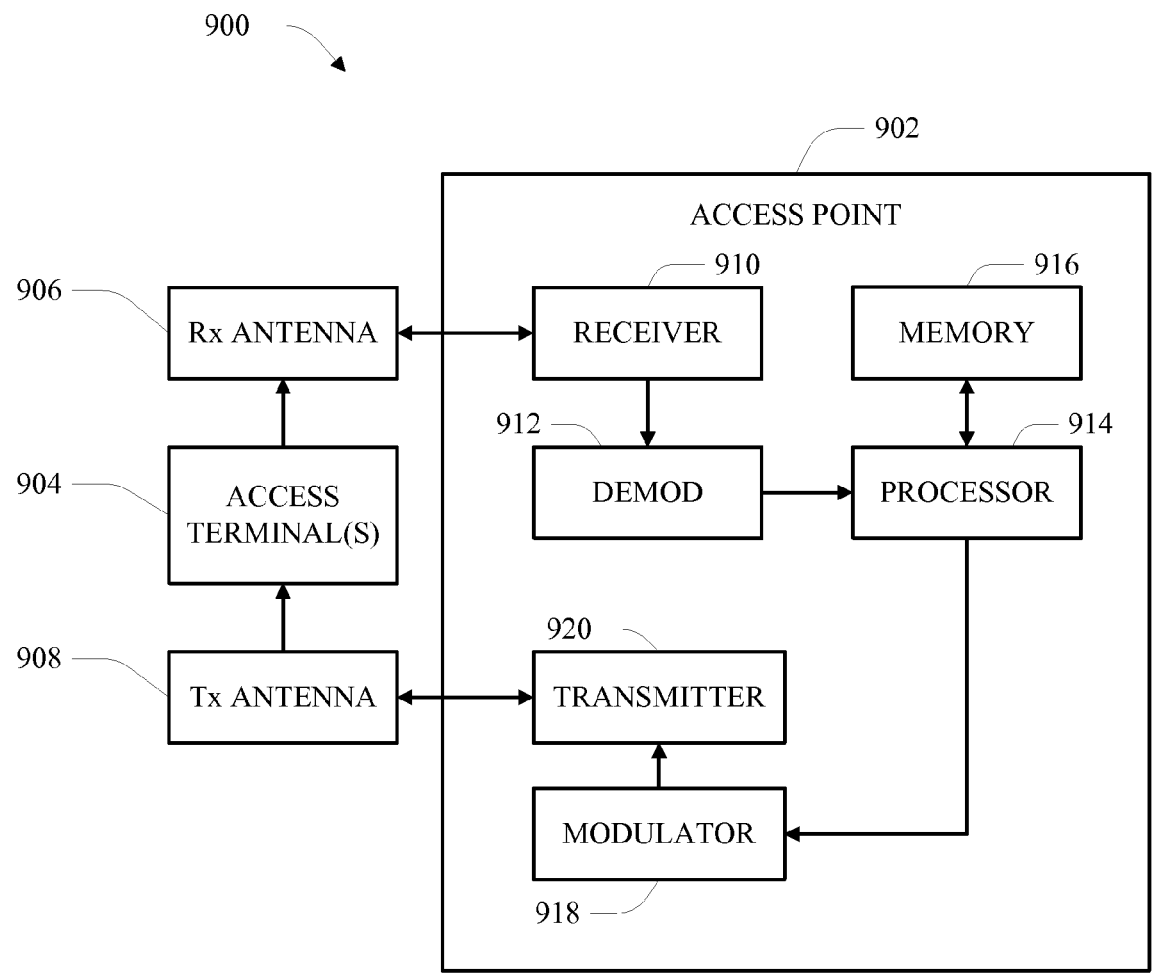
FIG. 9 is a block diagram of a system that coordinates generating and transmitting pilot sequences in a wireless communication system in accordance with various aspects.

FIG. 9 is a block diagram of a system 900 that coordinates generating and transmitting pilot sequences (e.g., TDM pilots 312-316) in a wireless communication system (e.g., system 100) in accordance with various aspects described herein. In one example, system 900 includes a base station or access point 902. As illustrated, access point 902 can receive signal (s) from one or more access terminals 904 via a receive (Rx) antenna 906 and transmit to the one or more access terminals 904 via a transmit (Tx) antenna 908. Additionally, access point 902 can comprise a receiver 910 that receives information from receive antenna 906. In one example, the receiver 910 can be operatively associated with a demodulator (Demod) 912 that demodulates received information. Demodulated symbols can then be analyzed by a processor 914. Processor 914 can be coupled to memory 916, which can store information related to the identity of access point 902 and/or one or more sectors (e.g., sectors 104) served by access point 902, pilot sequences, code clusters, access terminal assignments, lookup tables related thereto, unique scrambling sequences, and/or other suitable types of information. In one example, access point 902 can employ processor 914 to perform methodology 600 and/or other appropriate methodologies. Access point 902 can also include a modulator 918 that can multiplex a signal for transmission by a transmitter 920 through transmit antenna 908 to one or more access terminals 904.

Figure 10:
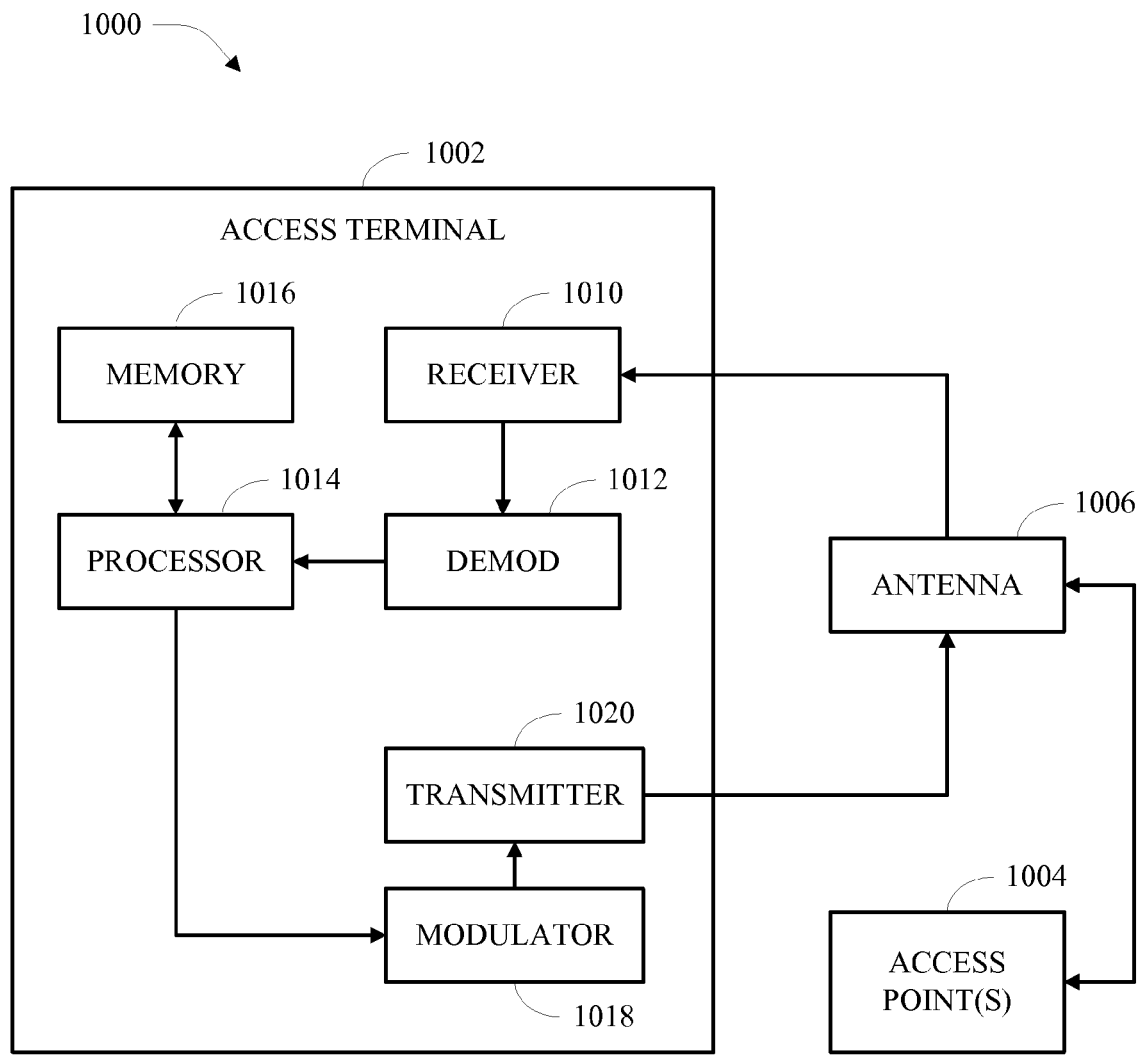
FIG. 10 is a block diagram of a system that coordinates signal acquisition in a wireless communication system in accordance with various aspects.

FIG. 10 is a block diagram of a system 1000 that coordinates signal acquisition in a wireless communication system in accordance with various aspects described herein. In one example, system 1000 includes an access terminal 1002. As illustrated, access terminal 1002 can receive signal(s) from one or more access points 1004 and transmit to the one or more access points 1004 via an antenna 1008. Additionally, access terminal 1002 can comprise a receiver 1010 that receives information from antenna 1008. In one example, receiver 1010 can be operatively associated with a demodulator (Demod) 1012 that demodulates received information. Demodulated symbols can then be analyzed by a processor 1010. Processor 1010 can be coupled to memory 1016, which can store data and/or program codes related to access terminal 1002. For example, memory 1016 can store data and/or program codes relating to detection of one or more pilot sequences and identification and/or synchronization with an access point 1004 based on detected pilot sequences. Additionally, access terminal 1002 can employ processor 1010 to perform methodology 700 and/or other appropriate methodologies. Access terminal 1002 can also include a modulator 1018 that can multiplex a signal for transmission by a transmitter 1020 via antenna 1008 to one or more access points 1004.

Figure 11:
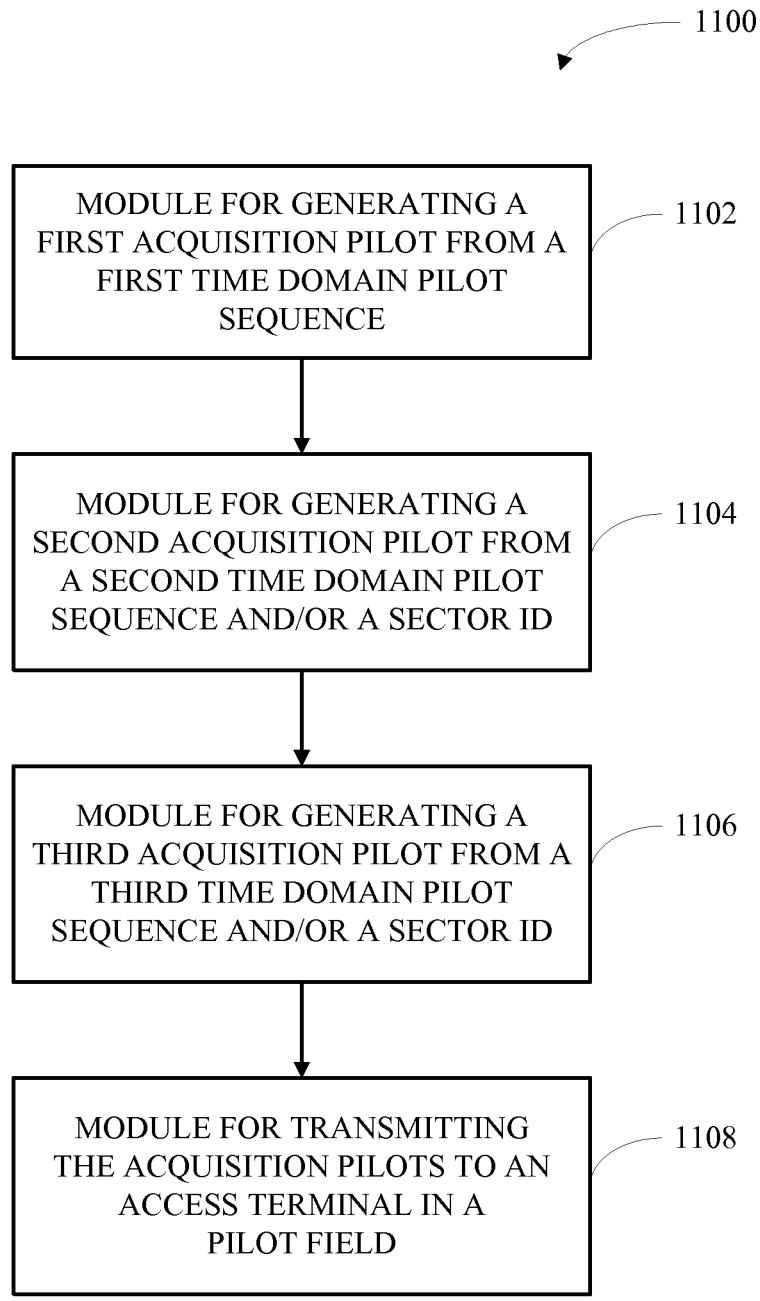
FIG. 11 is a block diagram of an apparatus that facilitates generating and transmitting acquisition pilots in a wireless communication system in accordance with various aspects.

FIG. 11 illustrates an apparatus 1100 that facilitates that facilitates generating and transmitting acquisition pilots in a wireless communication system (e.g., system 200). It is to be appreciated that apparatus 1100 is represented as including functional blocks, which can be functional blocks that represent functions implemented by a processor, software, or combination thereof (e.g., firmware). Apparatus 1100 can be implemented in conjunction with an access point (e.g., an access point 210) and/or an antenna group (e.g., an antenna group 212) and can include a module for generating a first acquisition pilot from a first time domain pilot sequence 1102. Apparatus 1100 may also include a module for generating a second acquisition pilot from a second time domain pilot sequence and/or a sector ID 1104 and a module for generating a third acquisition pilot from a third time domain pilot sequence and/or a sector ID 1106. Further, apparatus 1100 can include a module for transmitting the generated pilots to an access terminal (e.g., an access terminal 220) in a pilot field (e.g., a pilot field 230) 1108.

Figure 12:
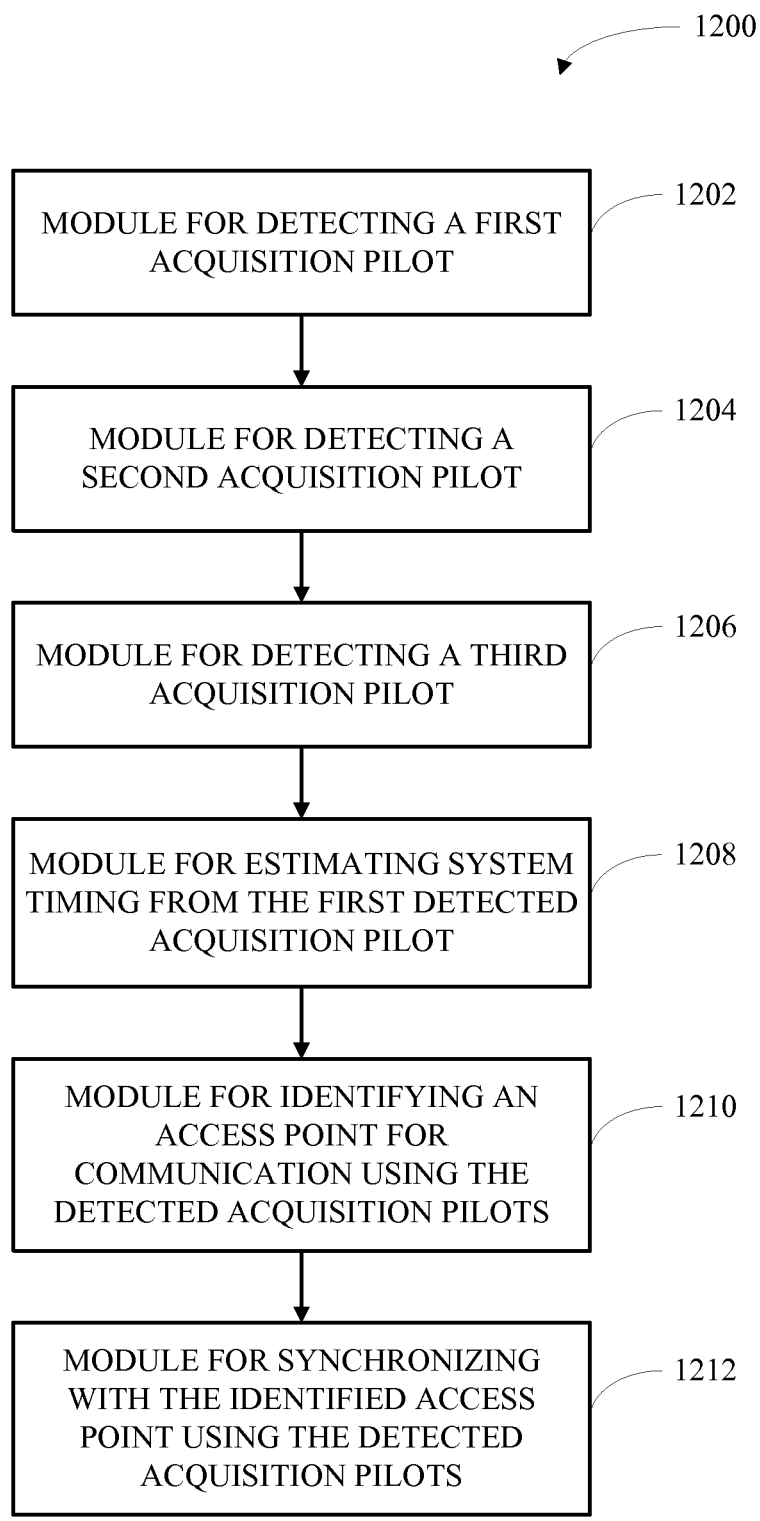
FIG. 12 is a block diagram of an apparatus that facilitates signal acquisition in a wireless communication system in accordance with various aspects.

FIG. 12 illustrates an apparatus 1200 that facilitates signal acquisition in a wireless communication system (e.g., system 200). It is to be appreciated that apparatus 1200 is represented as including functional blocks, which can be functional blocks that represent functions implemented by a processor, software, or combination thereof (e.g., firmware). Apparatus 1200 can be implemented in conjunction with an access terminal (e.g., an access terminal 220) and can include modules 1202, 1204, and 1206 for respectively detecting a first, second, and third acquisition pilot. Apparatus 1200 can also include a module for estimating system timing from the first detected acquisition pilots 1208, a module for identifying an access point (e.g., an access point 210 and/or an antenna group 212) for communication using the detected acquisition pilots 1210, and a module for synchronizing with the identified access point using the detected acquisition pilots 1212.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for generating and transmitting acquisition pilots in a wireless communication system, comprising:
generating a first acquisition pilot based on a portion of an identifier of a transmitter entity;
generating a second acquisition pilot based on all of the identifier of the transmitter entity;
transmitting the first acquisition pilot in a first time interval; and
transmitting the second acquisition pilot in a second time interval that is non-overlapping with the first time interval.

2. The method of claim 1, wherein the first acquisition pilot is generated based on a sequence having a low peak-to-average (PAR) ratio.

3. The method of claim 1, wherein the second acquisition pilot is generated based on a pseudo-noise (PN) sequence.

4. The method of claim 1, wherein the identifier of the transmitter entity comprises a sector identifier (ID).

5. The method of claim 1, wherein the generating the first acquisition pilot includes
generating a first pilot sequence based on the portion of the identifier of the transmitter entity, and
generating the first acquisition pilot based on the first pilot sequence.

6. The method of claim 5, wherein the generating the second acquisition pilot includes
generating a second pilot sequence based on all of the identifier of the transmitter entity, and
generating the second acquisition pilot based on the second pilot sequence.

7. The method of claim 1, further comprising:
generating a pilot based on symbols mapped to subcarriers evenly spaced in frequency; and
transmitting the pilot in a third time interval that is non-overlapping with the first and second time intervals.

8. The method of claim 1, wherein a scrambling code is applied to the second acquisition pilot.

9. The method of claim 1, wherein the first and second acquisition pilots are transmitted periodically in each time period of a predetermined duration.

10. A wireless communications apparatus, comprising:
a processor configured to generate a first acquisition pilot based on a portion of an identifier of a transmitter entity, to generate a second acquisition pilot based on all of the identifier of the transmitter entity, to transmit the first acquisition pilot in a first time interval, and to transmit the second acquisition pilot in a second time interval that is non-overlapping with the first time interval.

11. The wireless communications apparatus of claim 10, wherein the processor is further configured to generate the first acquisition pilot based on a sequence having a low peak-to-average (PAR) ratio.

12. The wireless communications apparatus of claim 10, wherein the processor is further configured to generate the second acquisition pilot based on a pseudo-noise (PN) sequence.

13. The wireless communications apparatus of claim 10, wherein the identifier for the transmitter entity comprises a sector identifier (ID).

14. The wireless communications apparatus of claim 10, wherein the processor is further configured to generate a first pilot sequence based on the portion of the identifier of the transmitter entity, and to generate the first acquisition pilot based on the first pilot sequence.

15. The wireless communications apparatus of claim 14, wherein the processor is further configured to generate a second pilot sequence based on all of the identifier of the transmitter entity, and to generate the second acquisition pilot based on the second pilot sequence.

16. The wireless communications apparatus of claim 10, wherein the processor is further configured to generate a pilot based on symbols mapped to subcarriers evenly spaced in frequency, and to transmit the pilot in a third time interval that is non-overlapping with the first and second time interval.

17. The wireless communications apparatus of claim 10, wherein the processor is further configured to generate the second acquisition pilot based on a scrambling code.

18. An apparatus for transmitting acquisition pilots in a wireless communication network, comprising:
means for generating a first acquisition pilot based on a portion of an identifier of a transmitter entity;
means for generating a second acquisition pilot based on all of the identifier of the transmitter entity;
means for transmitting the first acquisition pilot in a first time interval; and
means for transmitting the second acquisition pilot in a second time interval that is non-overlapping with the first time interval.

19. The apparatus of claim 18, wherein the first acquisition pilot is generated based on a sequence having a low peak-to-average (PAR) ratio.

20. The apparatus of claim 18, wherein the second acquisition pilot is generated based on a pseudo-noise (PN) sequence.

21. A non-transitory computer-readable medium having stored thereon computer-executable instructions for sending acquisition pilots in a wireless communication system, the instructions comprising:
generating a first acquisition pilot based on a portion of an identifier of a transmitter entity,
generating a second acquisition pilot based on all of the identifier of the transmitter entity,
transmitting the first acquisition pilot in a first time interval, and
transmitting the second acquisition pilot in a second time interval that is non-overlapping with the first time interval.

22. The non-transitory computer-readable medium of claim 21, wherein the first acquisition pilot is generated based on a sequence having a low peak-to-average (PAR) ratio.

23. The non-transitory computer-readable medium of claim 21, wherein the second acquisition pilot is generated based on a pseudo-noise (PN) sequence.

24. A processor that executes computer-executable instructions for transmitting acquisition pilots in a wireless communication network, the instructions comprising:
generating a first acquisition pilot based on a portion of an identifier of a transmitter entity;
generating a second acquisition pilot based on all of the identifier of the transmitter entity;
transmitting the first acquisition pilot in a first time interval; and
transmitting the second acquisition pilot in a second time interval that is non-overlapping with the first time interval.

25. The processor of claim 24, the instructions further comprising
generating the first acquisition pilot based on a sequence having a low peak-to-average (PAR) ratio, and
generating the second acquisition pilot based on a pseudo-noise (PN) sequence.

* * * * *